United States Patent
Puzio et al.

(10) Patent No.: US 7,588,399 B2
(45) Date of Patent: *Sep. 15, 2009

(54) PTO SELECTOR MECHANISM FOR PARALLEL AXIS TRANSMISSION

(75) Inventors: Daniel Puzio, Baltimore, MD (US); Paul K. Trautner, York, PA (US); David E. Scheerer, Perry Hall, MD (US); Jim D. Schroeder, Dallastown, PA (US)

(73) Assignee: Black & Decker Inc., Newark, DE (US)

( * ) Notice: Subject to any disclaimer, the term of this patent is extended or adjusted under 35 U.S.C. 154(b) by 56 days.

This patent is subject to a terminal disclaimer.

(21) Appl. No.: 11/693,384

(22) Filed: Mar. 29, 2007

(65) Prior Publication Data

US 2007/0170664 A1 Jul. 26, 2007

Related U.S. Application Data

(63) Continuation-in-part of application No. 11/400,378, filed on Apr. 10, 2006, and a continuation-in-part of application No. 11/227,200, filed on Sep. 16, 2005.

(60) Provisional application No. 60/787,153, filed on Mar. 30, 2006.

(51) Int. Cl.
*B23B 31/16* (2006.01)
(52) U.S. Cl. ........................ 408/124; 408/139; 279/60; 279/902
(58) Field of Classification Search ................ 408/124, 408/139; 279/60–65, 134, 135, 902; 409/124, 409/139; *B23B 31/16*
See application file for complete search history.

(56) References Cited

U.S. PATENT DOCUMENTS

| | | | |
|---|---|---|---|
| 913,059 A | | 2/1909 | Savage |
| 1,705,275 A | * | 3/1929 | Von Neudeck ............... 279/64 |
| 2,353,514 A | | 7/1944 | Slater |
| 2,684,856 A | | 7/1954 | Stoner |
| 2,716,555 A | | 8/1955 | Rowe Walker |
| 2,848,911 A | | 8/1958 | Black |
| 2,931,660 A | | 4/1960 | Barwinkel |
| 2,963,913 A | * | 12/1960 | Wensloff .................... 74/15.6 |
| 3,506,277 A | | 4/1970 | Harms |

(Continued)

FOREIGN PATENT DOCUMENTS

DE 1985830 5/1968

(Continued)

*Primary Examiner*—Eric A Gates
(74) *Attorney, Agent, or Firm*—Capitol City TechLaw

(57) ABSTRACT

A power driver may include a housing, a tool chuck and a power take off mechanism. The tool chuck may have an input shaft mounted for rotation on the housing. The input shaft may support chuck jaws. A chuck actuating shaft may be mounted for rotation on the input shaft. The power take off mechanism may be connected to the tool chuck. The power take off mechanism may be adjustable into a DRILL DRIVE MODE to rotationally drive the input shaft and the chuck actuating shaft together as a unit, and a CHUCK MODE to use the transmission shaft to rotationally drive the chuck actuating shaft relative to the input shaft. The transmission shaft may be a gear shaft axially aligned with the input shaft, or a tertiary shaft axially offset from the input shaft.

20 Claims, 16 Drawing Sheets

U.S. PATENT DOCUMENTS

| | | | |
|---|---|---|---|
| 3,545,766 A | 12/1970 | Osborn | |
| 3,776,647 A | 12/1973 | Hart | |
| 3,970,323 A | 7/1976 | Schnizler, Jr. | |
| 4,085,337 A * | 4/1978 | Moeller | 307/115 |
| 4,094,523 A | 6/1978 | Derbyshire | |
| 4,260,169 A | 4/1981 | Hall | |
| 4,277,074 A | 7/1981 | Kilberis | |
| 4,302,021 A | 11/1981 | Röhm | |
| 4,317,578 A | 3/1982 | Welch | |
| 4,323,324 A | 4/1982 | Eberhardt | |
| 4,358,230 A | 11/1982 | Rohlin | |
| 4,395,170 A | 7/1983 | Clarey | |
| 4,493,407 A | 1/1985 | Newton | |
| 4,498,682 A | 2/1985 | Glore | |
| 4,526,497 A | 7/1985 | Hatfield | |
| 4,527,809 A | 7/1985 | Umbert | |
| 4,536,113 A | 8/1985 | Hatfield | |
| 4,557,703 A | 12/1985 | Rivin | |
| 4,605,345 A | 8/1986 | Giughese | |
| 4,628,918 A | 12/1986 | Johnson, Jr. | |
| 4,655,464 A | 4/1987 | Manschitz et al. | |
| 4,664,394 A | 5/1987 | Theissig et al. | |
| 4,669,930 A | 6/1987 | Stenmark | |
| 4,669,932 A | 6/1987 | Hartley | |
| 4,682,918 A | 7/1987 | Palm | |
| 4,788,021 A | 11/1988 | Griffiths | |
| 4,802,798 A | 2/1989 | Adamson | |
| 4,824,298 A | 4/1989 | Lippacher et al. | |
| 4,840,387 A | 6/1989 | McCarthy | |
| 4,848,779 A | 7/1989 | Wheeler et al. | |
| 4,930,793 A | 6/1990 | Ando | |
| 4,951,955 A | 8/1990 | Sakamaki | |
| 4,955,623 A | 9/1990 | Röhm | |
| 4,958,840 A | 9/1990 | Palm | |
| 4,976,575 A | 12/1990 | Kappelhof et al. | |
| 4,998,589 A | 3/1991 | Wiesendanger | |
| 5,011,343 A | 4/1991 | Saban et al. | |
| 5,019,023 A | 5/1991 | Kurosawa | |
| 5,022,278 A | 6/1991 | DeCaussin | |
| 5,031,925 A * | 7/1991 | Tatsu et al. | 279/64 |
| 5,067,376 A | 11/1991 | Fosella | |
| 5,090,273 A | 2/1992 | Fossella | |
| 5,125,673 A | 6/1992 | Huff et al. | |
| 5,145,193 A | 9/1992 | Röhm | |
| 5,147,164 A | 9/1992 | Fraver | |
| 5,171,030 A | 12/1992 | Röhm | |
| 5,172,923 A | 12/1992 | Nakamura | |
| 5,174,588 A | 12/1992 | Reibetanz et al. | |
| 5,183,274 A | 2/1993 | Sakamaki | |
| 5,195,760 A * | 3/1993 | Wheeler et al. | 279/60 |
| 5,197,749 A | 3/1993 | Moore et al. | |
| 5,215,317 A | 6/1993 | Jordan et al. | |
| 5,232,230 A | 8/1993 | Lin | |
| 5,286,041 A | 2/1994 | Röhm | |
| 5,299,814 A | 4/1994 | Salpaka | |
| 5,322,303 A | 6/1994 | Nakamura | |
| 5,339,908 A | 8/1994 | Yokota et al. | |
| 5,340,248 A | 8/1994 | Enbergs | |
| 5,342,154 A | 8/1994 | Holzer | |
| 5,343,961 A | 9/1994 | Ichikawa | |
| 5,348,317 A | 9/1994 | Steadings et al. | |
| 5,348,318 A | 9/1994 | Steadings et al. | |
| 5,407,215 A | 4/1995 | Yang | |
| 5,419,663 A | 5/1995 | Psomas | |
| 5,431,420 A | 7/1995 | Huff et al. | |
| 5,435,578 A | 7/1995 | Röhm | |
| 5,448,931 A | 9/1995 | Fossella et al. | |
| 5,458,345 A | 10/1995 | Amyot | |
| 5,499,829 A | 3/1996 | Röhm | |
| 5,499,830 A | 3/1996 | Schnizler | |
| 5,531,549 A | 7/1996 | Fossella | |
| 5,553,873 A | 9/1996 | Salpaka et al. | |
| 5,573,358 A | 11/1996 | Gobbers et al. | |
| 5,624,125 A | 4/1997 | Röhm | |
| 5,685,549 A | 11/1997 | Yang | |
| 5,732,956 A | 3/1998 | Huff et al. | |
| 5,741,016 A | 4/1998 | Barton et al. | |
| 5,795,110 A | 8/1998 | Wirth et al. | |
| 5,820,134 A | 10/1998 | Subils Valls | |
| 5,908,076 A | 6/1999 | Marcengill et al. | |
| 5,918,685 A | 7/1999 | Ulbrich et al. | |
| 5,922,538 A | 7/1999 | Hazel et al. | |
| 5,951,026 A | 9/1999 | Harman, Jr. et al. | |
| 5,957,469 A | 9/1999 | Miles et al. | |
| 5,988,653 A | 11/1999 | Kuo | |
| 5,988,958 A | 11/1999 | Mack | |
| 5,992,859 A | 11/1999 | Lin | |
| 6,007,071 A | 12/1999 | Middleton | |
| 6,007,277 A | 12/1999 | Olson et al. | |
| 6,017,039 A | 1/2000 | Gaddis et al. | |
| 6,056,298 A | 5/2000 | Williams | |
| 6,079,716 A | 6/2000 | Harman, Jr. et al. | |
| 6,105,450 A | 8/2000 | Sasaki et al. | |
| 6,139,228 A | 10/2000 | Longo | |
| 6,173,972 B1 | 1/2001 | Temple-Wilson et al. | |
| 6,241,260 B1 * | 6/2001 | Judge et al. | 279/64 |
| 6,260,856 B1 | 7/2001 | Temple-Wilson | |
| 6,354,605 B1 | 3/2002 | Aultman | |
| 6,398,226 B1 | 6/2002 | Huggins et al. | |
| 6,431,289 B1 | 8/2002 | Potter | |
| 6,488,286 B2 | 12/2002 | Yaksich | |
| 6,488,287 B2 | 12/2002 | Gaddis et al. | |
| 6,506,002 B1 | 1/2003 | Cummins | |
| 6,517,295 B2 | 2/2003 | Lin | |
| 6,523,658 B2 | 2/2003 | Furuta et al. | |
| 6,648,563 B2 | 11/2003 | Rohm | |
| 6,729,812 B2 | 5/2004 | Yaksich et al. | |
| 6,733,393 B2 | 5/2004 | Rivin | |
| 6,736,410 B2 | 5/2004 | Barton et al. | |
| 6,832,764 B2 | 12/2004 | Steadings et al. | |
| 6,843,484 B2 * | 1/2005 | Schroeder | 279/60 |
| 7,021,400 B2 | 4/2006 | Oretti | |
| 7,073,606 B2 | 7/2006 | Mamber et al. | |
| 7,328,904 B2 * | 2/2008 | Schell et al. | 279/60 |
| 2001/0026051 A1 | 10/2001 | Gifford et al. | |
| 2003/0077137 A1 | 4/2003 | Rohm | |
| 2004/0146367 A1 | 7/2004 | Gerhardt et al. | |
| 2005/0013674 A1 | 1/2005 | Vidal | |
| 2006/0027978 A1 | 2/2006 | Young et al. | |
| 2006/0066063 A1 | 3/2006 | Nickels et al. | |
| 2006/0188350 A1 * | 8/2006 | Gehret et al. | 408/240 |

FOREIGN PATENT DOCUMENTS

| | | |
|---|---|---|
| DE | 2317779 | 10/1974 |
| DE | 7536582 | 5/1976 |
| DE | 7617128 | 12/1976 |
| DE | 2757140 | 6/1979 |
| DE | 8002633 | 7/1980 |
| DE | 3110458 | 10/1982 |
| DE | 3140776 | 4/1983 |
| DE | 8513848 | 8/1985 |
| DE | 9006555 | 9/1990 |
| DE | 9405628 | 7/1994 |
| DE | 3527234 | 2/1997 |
| DE | 29820433 | 3/1999 |
| DE | 29913083 | 10/1999 |
| DE | 10125186 | 12/2002 |
| DE | 202004003323 | 8/2004 |
| DE | 10359420 | 7/2005 |
| EP | 0448801 | 10/1991 |
| EP | 0515371 | 12/1992 |
| EP | 0620069 | 10/1994 |
| EP | 0716896 | 1/1995 |

| | | | | | |
|---|---|---|---|---|---|
| EP | 0674961 | 10/1995 | WO | WO 02/058893 A1 | 8/2002 |
| EP | 1101553 | 5/2001 | WO | WO 2005/025792 | 3/2005 |
| FR | 1602481 | 1/1971 | WO | WO 2006/034287 A2 | 3/2006 |
| WO | WO 00/35619 | 6/2000 | | | |

* cited by examiner

US 7,588,399 B2

PTO SELECTOR MECHANISM FOR PARALLEL AXIS TRANSMISSION

CROSS REFERENCE TO RELATED APPLICATIONS

This U.S. non-provisional application claims priority under 35 USC §119 to U.S. Provisional Application No. 60/787,153 filed Mar. 30, 2006, the content of which is incorporated herein in its entirety by reference. This U.S. non-provisional application is a Continuation-In-Part of (1) U.S. application Ser. No. 11/227,200 filed Sep. 16, 2005 and (2) U.S. application Ser. No. 11/400,378 filed Apr. 10, 2006, the content of both of which is incorporated herein in its entirety by reference.

BACKGROUND

1. Field of the Invention

Example embodiments of the present invention relate in general to tool chucks for attachment of accessories to power drivers, and more particularly to a tool chuck having chuck jaws that may be actuated via power from the driver's transmission.

2. Description of Related Art

A tool chuck may be provided on a power driver for holding an accessory. The tool chuck may be actuated (to open and close the chuck jaws) via a power take off ("PTO") feature. Numerous and varied PTO features are described in commonly-assigned, copending application Ser. No. 11/227,200 filed Sep. 16, 2005, and Ser. No. 11/400,378 filed Apr. 10, 2006. In those copending applications, the component parts of the PTO mechanism may be positioned to achieve different operational modes inclusive of a MANUAL OVERRIDE MODE, a DRILL/DRIVE MODE and a CHUCK MODE.

SUMMARY

According to an example, non-limiting embodiment, a power driver may include a housing. A transmission shaft may be mounted for rotation on the housing. A tool chuck may have an input shaft mounted for rotation on the housing and supporting chuck jaws, and a chuck actuating shaft mounted for rotation on the input shaft. A power take off mechanism may be connected to the tool chuck. The power take off mechanism may be adjustable into (1) a DRILL DRIVE MODE to rotationally drive the input shaft and the chuck actuating shaft together as a unit, and (2) a CHUCK MODE to use the transmission shaft to rotationally drive the chuck actuating shaft relative to the input shaft.

According to another example, non-limiting embodiment, a power driver may have a transmission shaft. A tool chuck may have an input shaft supporting chuck jaws, and a chuck actuating shaft mounted for rotation on the input shaft. Power take off means may be provided for adjusting into (1) a DRILL DRIVE MODE to rotationally drive the input shaft and the chuck actuating shaft together as a unit, and a CHUCK MODE to use the transmission shaft to rotationally drive the chuck actuating shaft relative to the input shaft.

According to another example, non-limiting embodiment, a power driver may have a tool chuck with an input shaft with a rotation axis, and a chuck actuating shaft mounted for rotation on the input shaft. A transmission shaft may be provided with a rotation axis that is parallel to and spaced apart from the rotation axis of the input shaft. A power take off mechanism may be connected to the tool chuck. The power take off mechanism may be adjustable into (1) a DRILL DRIVE MODE to rotationally drive the input shaft and the chuck actuating shaft together as a unit, and (2) a CHUCK MODE to use the transmission shaft to rotationally drive the chuck actuating shaft relative to the input shaft.

The above and other features of the invention including various and novel details of construction and combinations of parts will now be more particularly described with reference to the accompanying drawings. It will be understood that the details of the example embodiments are shown by way of illustration only and not as limitations of the invention. The principles and features of this invention may be employed in varied and numerous embodiments without departing from the spirit and scope of the invention.

DESCRIPTION OF EXAMPLE, NON-LIMITING EMBODIMENTS

I. Example Embodiment Depicted in FIGS. 1-5

Figure 1:
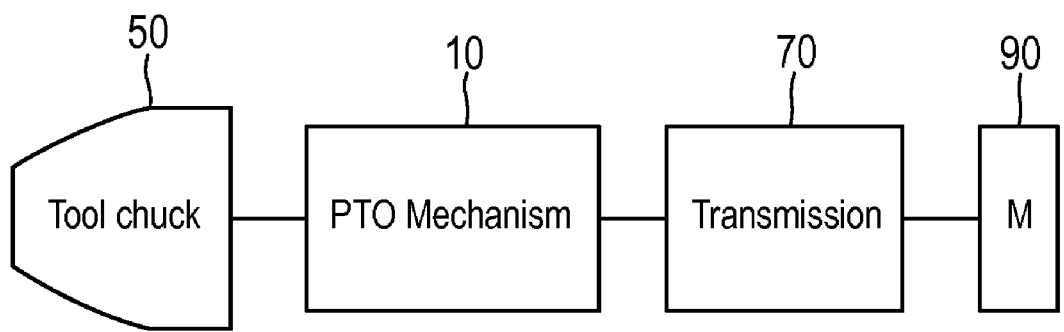
FIG. 1 is a schematic illustration of a tool chuck with a power take off mechanism according to an example, non-limiting embodiment.

FIG. 1 schematically shows an example, non-limiting embodiment of a tool chuck 50 that may be provided on a power driver (e.g., a drill) for holding an accessory (e.g., a drill bit). It will be appreciated, however, that the tool chuck 50 may be suitably implemented on a variety of power drivers (other than drills) for holding a variety of accessories (other than drill bits).

The tool chuck 50 may be connected to the transmission 70 of the power driver via a power take off ("PTO") mechanism 10. The transmission 70 may be coupled to an electric motor 90. The transmission 70 may use gearing to effect a change in the ratio between an input rpm (from the electric motor 90) and an output rpm (delivered to the tool chuck 50). In this example embodiment, the transmission 70 may be a parallel axis transmission.

Figure 2:
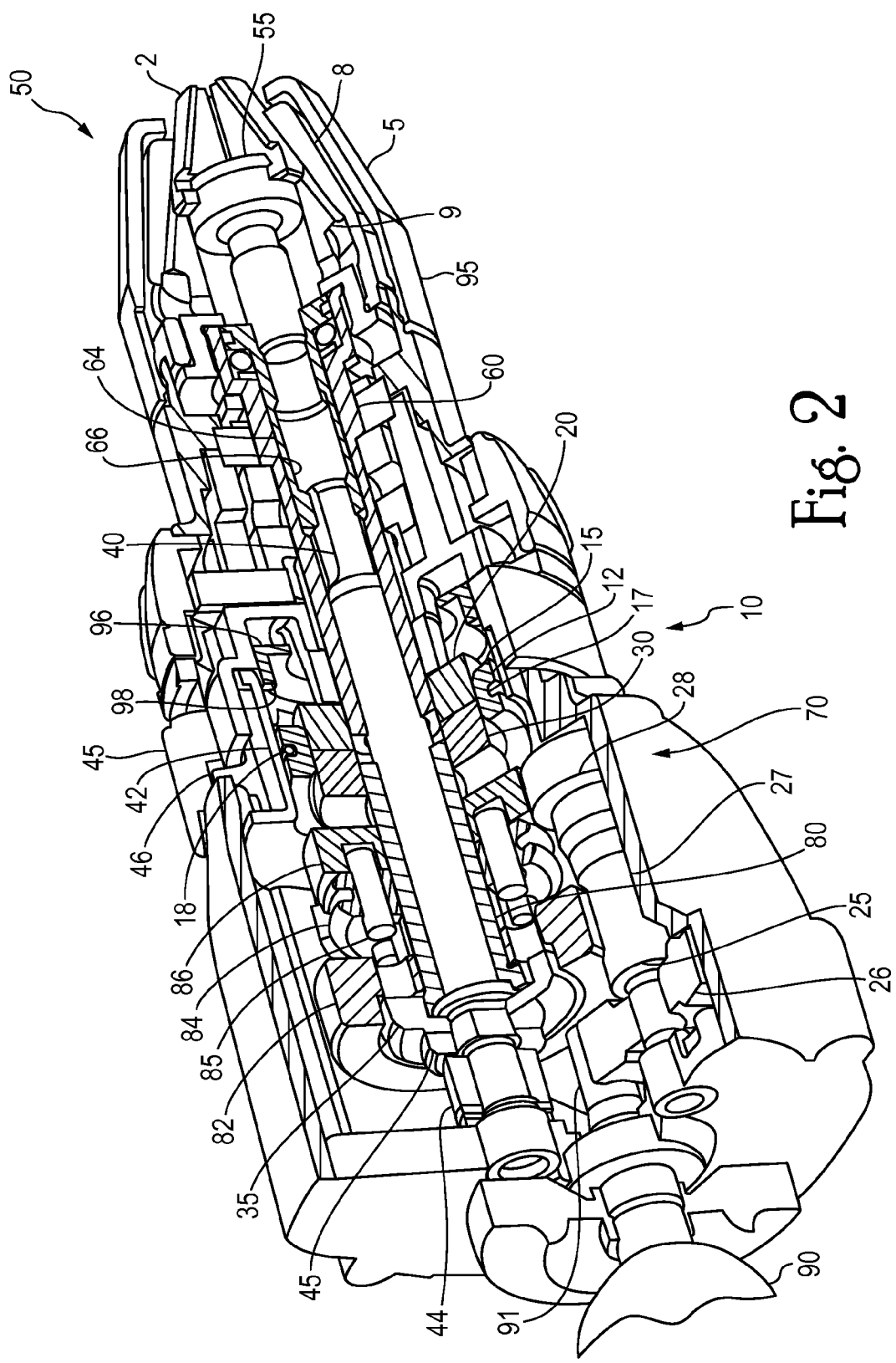
FIG. 2 is a sectional view of the power take off mechanism in a DRILL/DRIVE MODE.

A. The Structure:

With reference to FIG. 2, the PTO mechanism 10 may include a shift ring 12, an output coupling 20 and a gear shaft coupling 30.

The shift ring 12 may have a radial inward facing surface provided with splines for selectively engaging with the output coupling 20 and the gear shaft coupling 30. The shift ring 12 may have axial forward facing lugs 15 for selectively engaging with a lock ring 96. The shift ring 12 may have a continuous circumferential groove 17 (for accommodating a wire 18).

The wire 18, which may be slidable through the circumferential groove 17, may have free ends that extend in a radial direction and out of the circumferential groove 17. The free ends of the wire 18 (serving as cam followers) may be received in a slot of a shift collar 42 rotatably mounted on the driver housing 95. The shift collar may be rotationally coupled (via a radial extension 46) to a mode ring 45 rotatably mounted on the driver housing 95. A user may rotate the mode ring 45 (and thus the shift collar 42) relative to the housing 95 to influence the cam followers (and thus the shift ring 12) to the desired axial positions, as will be discussed in more detail below.

The output coupling 20 may be fixedly mounted on an input shaft 60. The output coupling 20 may have a radial outward facing surface provided with splines that cooperate with the radial inward facing splines of the shift ring 12.

The gear shaft coupling 30 may be fixedly mounted on a gear shaft 80. The gear shaft coupling 30 may have a radial outward facing surface provided with splines that selectively cooperate with the radial inward facing splines of the shift ring 12.

The gear shaft 80 and the input shaft 60 may have respective through bores that rotatably support a PTO actuator shaft 40. The forward end of the PTO actuator shaft 40 may be rotationally fixed to a chuck actuating shaft 64. The rear end of the PTO actuator shaft 40 may support a clutch feature 45 that cooperates with a clutch feature 35 mounted on the gear shaft 80. The clutch feature 45 may be rotationally fixed to the PTO actuator shaft 40 and axially moveable along the PTO actuator shaft 40. A spring 44 may be captured between the driver housing 95 and the clutch feature 45 to influence the clutch feature 45 in an axial forward direction and into engagement with the clutch feature 35.

The gear shaft 80 may support the clutch feature 35 for limited relative rotational movement. For example, and turning briefly to FIG. 5, the clutch feature 35 may include an axial forward facing recess 36 that may receive the rear end of the gear shaft 80. The recess 36 may be shaped to accommodate an angular displacement α of the gear shaft 80 (relative to the clutch feature 35). Side walls of the recess 36 may abut against corresponding flats on the gear shaft 80 to limit the relative angular displacement α between the gear shaft 80 and the clutch feature 35.

Turning back to FIG. 2, the gear shaft 80 may support a first driven gear 82, a shift plate 84 and a second driven gear 86. The shift plate 84 may be rotationally fixed to (and axially moveable relative to) the gear shaft 80. The shift plate 84 may include drive lugs 85 for selectively engaging with corresponding features (e.g., recesses) respectively provided in the first driven gear 82 and the second driven gear 86 (depending on the axial position of the shift plate 84). As shown in FIG. 2, the shift plate 84 may be located at an axial forward position so that the shift plate 84 (via the drive lugs 85) may be rotationally locked to the second driven gear 86. The shift plate 84 may be coupled to a selector (not shown), which may be mounted on the driver housing 95. A user may manipulate the selector to drive the shift plate 84 to the desired axial positions.

The first driven gear 82 may be axially fixed to (and rotatable relative to) the gear shaft 80. The second driven gear 86 may be axially fixed to (and rotatable relative to) the gear shaft 80.

The electric motor 90 may have a rotary shaft that supports an output gear 91. The output gear 91 may engage with an input gear 26, which may be fixed to an intermediate shaft 25. The intermediate shaft 25 may be mounted for rotation in the driver housing 95. The intermediate shaft 25 may fixedly support a first drive gear 27 and a second drive gear 28. The first drive gear 27 may engage with the first driven gear 82. And the second drive gear 28 may engage with the second driven gear 86. The second drive gear 28 may be larger than the first drive gear 27. Therefore, when the driver is powered up, the second driven gear 86 may be driven at a faster rotational speed than the first driven gear 82.

The tool chuck 50 may include the input shaft 60. The axial forward end of the input shaft 60 may be fixed to a jaw holder 9. The jaw holder 9 may include passageways through which chuck jaws 2 are respectively slidable. The chuck jaws 2 may be moved axially via slots in a chuck actuating screw 55. The chuck jaws 2 may be guided radially by the jaw holder 9 and a chuck cone 8. It will be appreciated that the chuck actuating screw 55 and the jaw holder 9 may be rotationally locked together via the chuck jaws 2. A removable cover 5 may be mounted on the driver housing 95 to shield the jaw holder 9 and the chuck cone 8.

The input shaft 60 may include a through bore that rotatably supports the chuck actuating shaft 64. The chuck actuating shaft 64 may include a through bore 66. A rear end of the through bore 66 may receive the PTO actuator shaft 40. The through bore 66 and the PTO actuator shaft 40 may have corresponding shapes to rotationally fix the chuck actuating shaft 64 to the PTO actuator shaft 40. The forward end of the through bore 66 may be provided with radial inward facing threads that may interact with radial outward facing threads of the chuck actuating screw 55. That is, the chuck actuating shaft 64 may be screw coupled to the chuck actuating screw 55.

The lock ring 96 may be rotationally fixed to (and axially moveable relative to) the driver housing 95. A spring (not shown) may be captured between the driver housing 95 and the lock ring 96 to influence the lock ring 96 in an axial rearward direction. The lock ring 96 may include axial rearward facing lugs 98 that selectively cooperate with the axial forward facing lugs 15 of the shift ring 12.

B. The Operation:

The tool chuck 50 may operate differently depending on the axial position of shift ring 12, which may assume three different operating positions inclusive of a DRILL/DRIVE MODE, a MANUAL OVERRIDE MODE and a CHUCK MODE.

FIG. 2 illustrates the shift ring 12 in the DRILL/DRIVE MODE, in which the shift ring 12 may be located at an axial rearward position. Here, the shift ring 12 may be disengaged from (and rotatable relative to) the lock ring 96 (and thus the driver housing 95). The radial inward facing splines of the shift ring 12 may engage with the radial outward facing splines of the output coupling 20 and the radial outward facing splines of the gear shaft coupling 30. In this way, the shift ring 12 may rotationally lock together the input shaft 60 and the gear shaft 80.

When the user powers up the driver, the electric motor 90 (via the output gear 91) may rotationally drive the intermediate shaft 25 (via the input gear 26). The first drive gear 27 and the second drive gear 28 (fixed to the intermediate shaft 25) may rotationally drive the first driven gear 82 and the second driven gear 86, respectively. In the condition shown in FIG. 2, the shift plate 84 (via the drive lugs 85) may be rotationally locked to the second driven gear 86. Thus, the power from the transmission 70 may be delivered to the gear shaft 80 via the second drive gear 28, the second driven gear 86 and the shift plate 84. The first driven gear 82 may rotate relative to the gear shaft 80.

The gear shaft 80 may rotate together as a unit with the gear shaft coupling 30, the shift ring 12, the output coupling 20, the input shaft 60, the jaw holder 9, the chuck jaws 2 and the chuck actuating screw 55. At the same time, the gear shaft 80 may rotationally drive the PTO actuator shaft 40 (and thus the chuck actuating shaft 64) via the cooperating clutch features 35, 45. This may prevent relative motion between the input shaft 60 and the chuck actuating shaft 64 so that the chuck jaws 2 may not open or close during operation.

Figure 3:
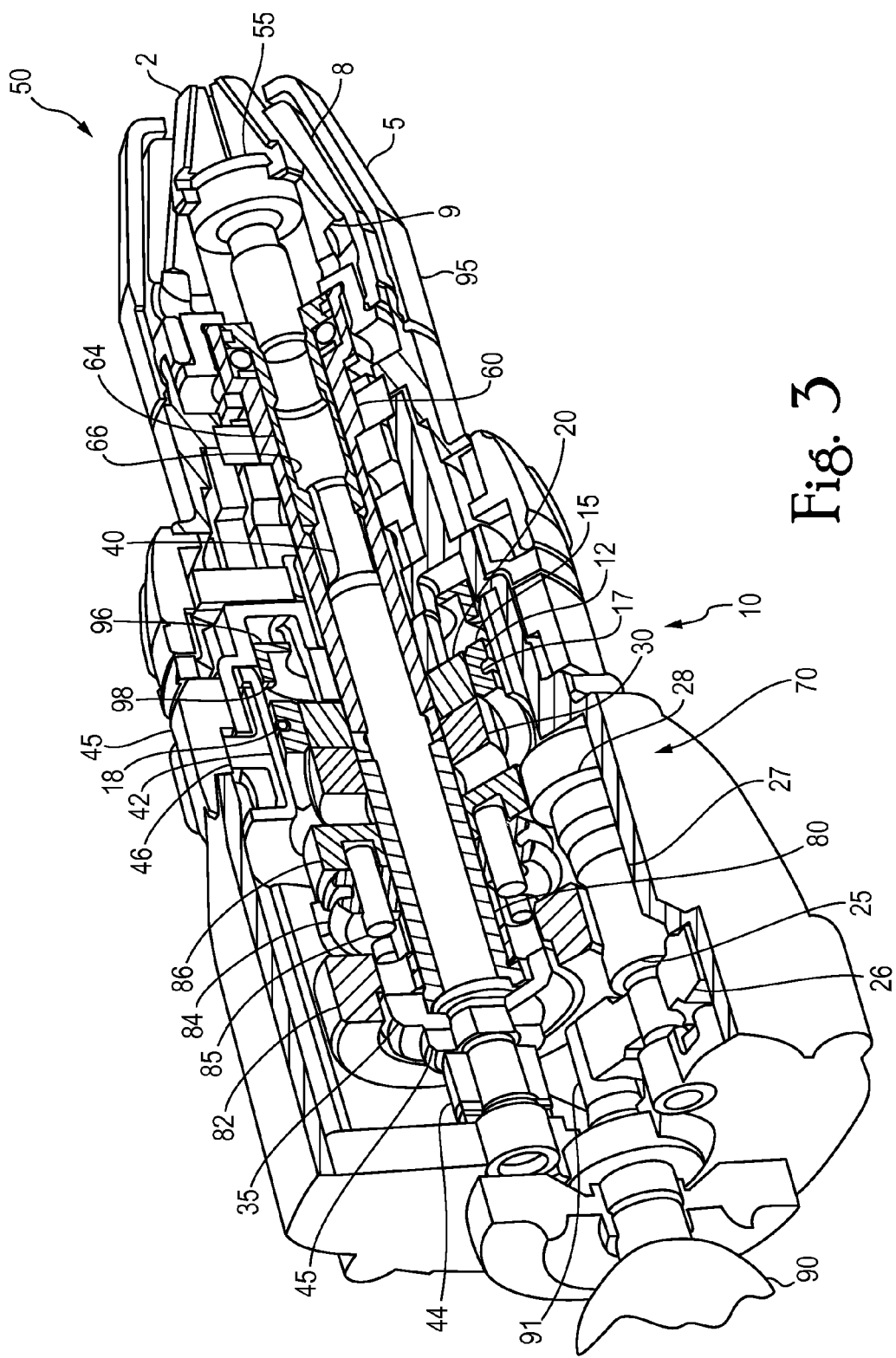
FIG. 3 is a sectional view of the power take off mechanism in a MANUAL OVERRIDE MODE.

FIG. 3 illustrates the shift ring 12 in the MANUAL OVERRIDE MODE, in which the shift ring 12 may be located at an axial intermediate position. Here, the shift ring 12 may be disengaged from (and rotatable relative to) the lock ring 96 (and thus the driver housing 95). The radial inward facing splines of the shift ring 12 may be engaged with the radial outward facing splines of the output coupling 20. Thus, the shift ring 12 (and the input shaft 60) may be rotatable relative to the housing 95 and the gear shaft 80.

The user may remove the cover 5 and manually rotate the jaw holder 9 (and thus the input shaft 60). At this time, transmission and motor drag may prevent the gear shaft 80 (and thus the PTO actuator shaft 40 and the chuck actuating shaft 64) from rotating relative to the driver housing 95 so that the chuck actuating screw 55 may rotate relative to the chuck actuating shaft 64. This relative rotation may cause the chuck actuating screw 55 to advance or retract in the axial direction (depending on the rotation direction of the input shaft 60). The translational movement of the chuck actuating screw 55 may push or pull on the chuck jaws to open or close the same. This pusher type jaw action is well known in the pertinent art.

In the MANUAL OVERRIDE MODE depicted in FIG. 3, the cooperating clutch features 35, 45 of the gear shaft 30 and the PTO actuator shaft 40 may give way or slip to prevent the system from being over torqued manually and/or in the event that the driver is inadvertently powered up.

Figure 4:
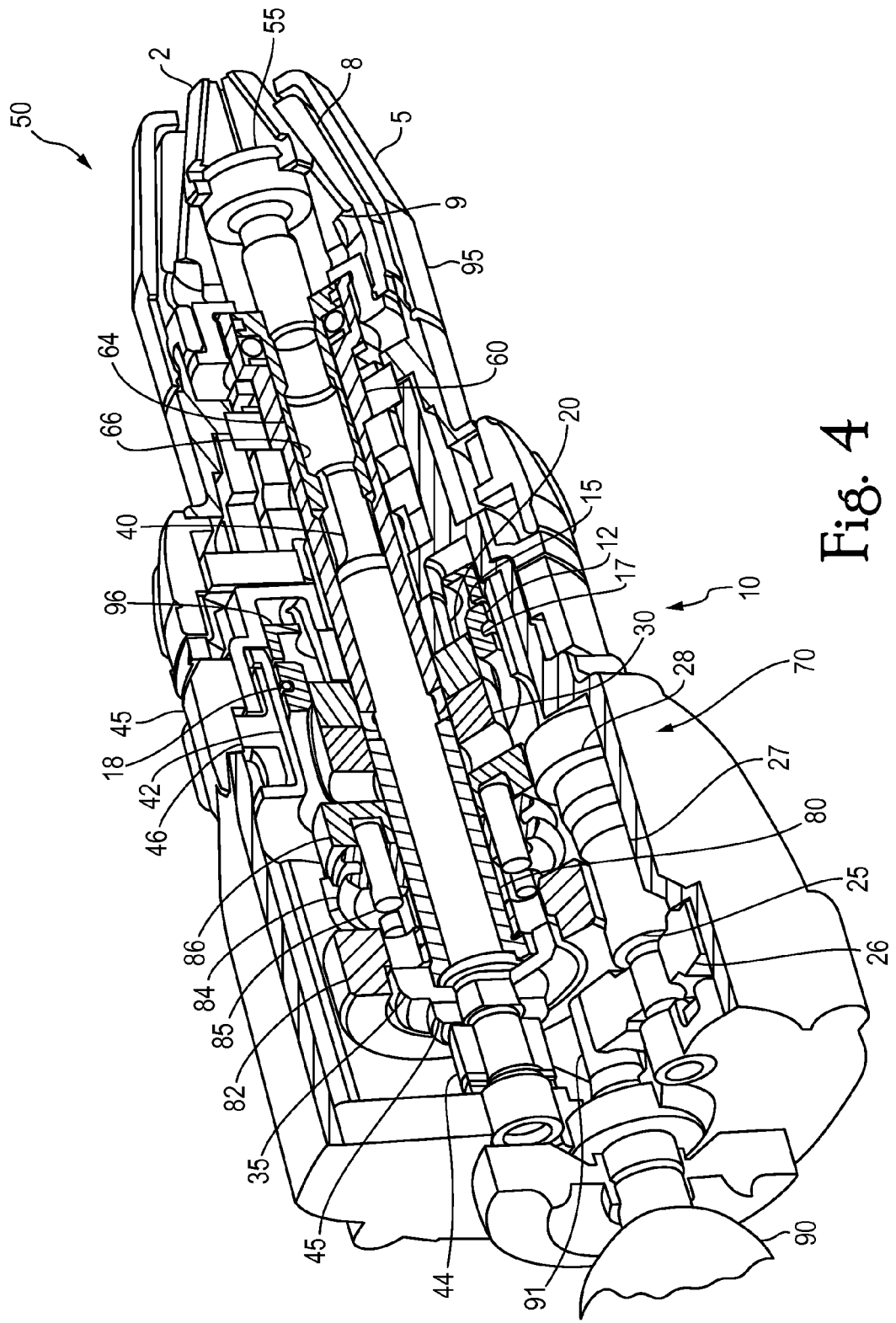
FIG. 4 is a sectional view of the power take off mechanism in a CHUCK MODE.

FIG. 4 illustrates the shift ring 12 in the CHUCK MODE, in which the shift ring 12 may be located in a forward axial position. Here, the radial inward facing splines of the shift ring 12 may engage with the radial outward facing splines of the output coupling 20. Also, the forward facing lugs 15 of the shift ring 12 may engage with the rearward facing lugs 98 of the lock ring 96 to rotationally ground the shift ring 12 to the driver housing 95. If the shift ring 12 is properly clocked to (or angularly positioned relative to) the lock ring 96, then the lugs 15 may enter into the spaces between the lugs 98 to achieve the desired engagement. However, the angular position of the shift ring 12 (relative to the lock ring 96) may be such that the lugs 15, 98 hit in a head-to-head fashion. In this condition, the shift ring 12 may drive the lock ring 96 in an axial forward direction and against the influence of the spring (not shown). In this way, the shift ring 12 may be located in the desired forward axial position, notwithstanding the head-to-head collision of the lugs 15, 98. Thus, the lock ring 96 may offer a "compliant grounding" feature to the extent that the lock ring 96 may give way to the forward axial travel of the shift ring 12.

The user may then power up the driver to actuate the tool chuck 50. Power from the transmission 70 may be delivered to the gear shaft 80 via the second drive gear 28, the second driven gear 86 and the shift plate 84. The gear shaft 80 may rotationally drive the PTO actuator shaft 40 (and thus the chuck actuating shaft 64) through the cooperating clutch features 45, 35. Due to frictional drag (e.g., between the cooperating threads of the chuck actuating shaft 64 and the chuck actuating screw 55), the chuck actuating shaft 64 may rotate together with the input shaft 60 (and thus the output coupling 20 and the shift ring 12). The shift ring 12 may rotate relative to the lock ring 96 until the shift ring 12 is properly clocked to (or angularly positioned relative to) the lock ring 96. At this time, the spring (not shown) may influence the lock ring 96 in an axial rearward direction causing the lugs 15 to enter into the spaces between the lugs 98. In this condition, the shift ring 12 and the output coupling 20 (and therefore the input shaft 60 and the chuck actuating screw 55) may be rotationally grounded to the driver housing 95.

The gear shaft 80 may continue to rotationally drive the PTO actuator shaft 40, which in turn may continue to rotationally drive the chuck actuating shaft 64. Here, the chuck actuating shaft 64 may rotate relative to the chuck actuating screw 55, which may remain rotationally grounded to the driver housing 95 (via the chuck jaws 2, the jaw holder 9, the input shaft 60, the output coupling 20, the shift ring 12 and the lock ring 96). This relative rotation may cause the chuck actuating screw 55 to advance or retract in the axial direction (depending on the rotation direction of the chuck actuating shaft 64) to open or close the chuck jaws 2.

During chuck actuation, the input shaft 60, the jaw holder 9, the chuck jaws 2 and the chuck actuating screw 55 may remain rotationally grounded to the driver housing 95, while the chuck actuating screw 55 moves axially relative to the jaw holder 9 to open and close the chuck jaws 2. This may be referred to as a dead spindle feature since the user is not exposed to (or observe) any rotating parts.

Once the tool chuck 50 is tight (i.e., when the chuck jaws clamp the accessory) or fully opened, the cooperating clutch features 35, 45 respectively provided on the gear shaft 80 and the PTO actuator shaft 40 may give way and slip relative to each other. At this time, the clutch feature 45 may move in an axial rearward direction against the influence of the spring 44. When the cooperating clutch features 35, 45 slip, they may produce an audible indication that the chuck actuation process is complete.

The cooperating clutch features 35, 45 may give way or slip at a predetermined torque threshold. The predetermined torque threshold may be suitably adjusted by selecting an appropriate spring 44 and/or by suitably designing the geometries of the cooperating clutch features 35, 45. Further, the predetermined torque threshold for tightening the tool chuck 50 may be less than the predetermined torque threshold for loosening the tool chuck 50. This feature may be obtained by suitably designing the geometries of the cooperating clutch features 35, 45. Numerous and varied clutch surface geometries are well known in this art, and therefore a detailed discussion of the same is omitted.

Figure 5:
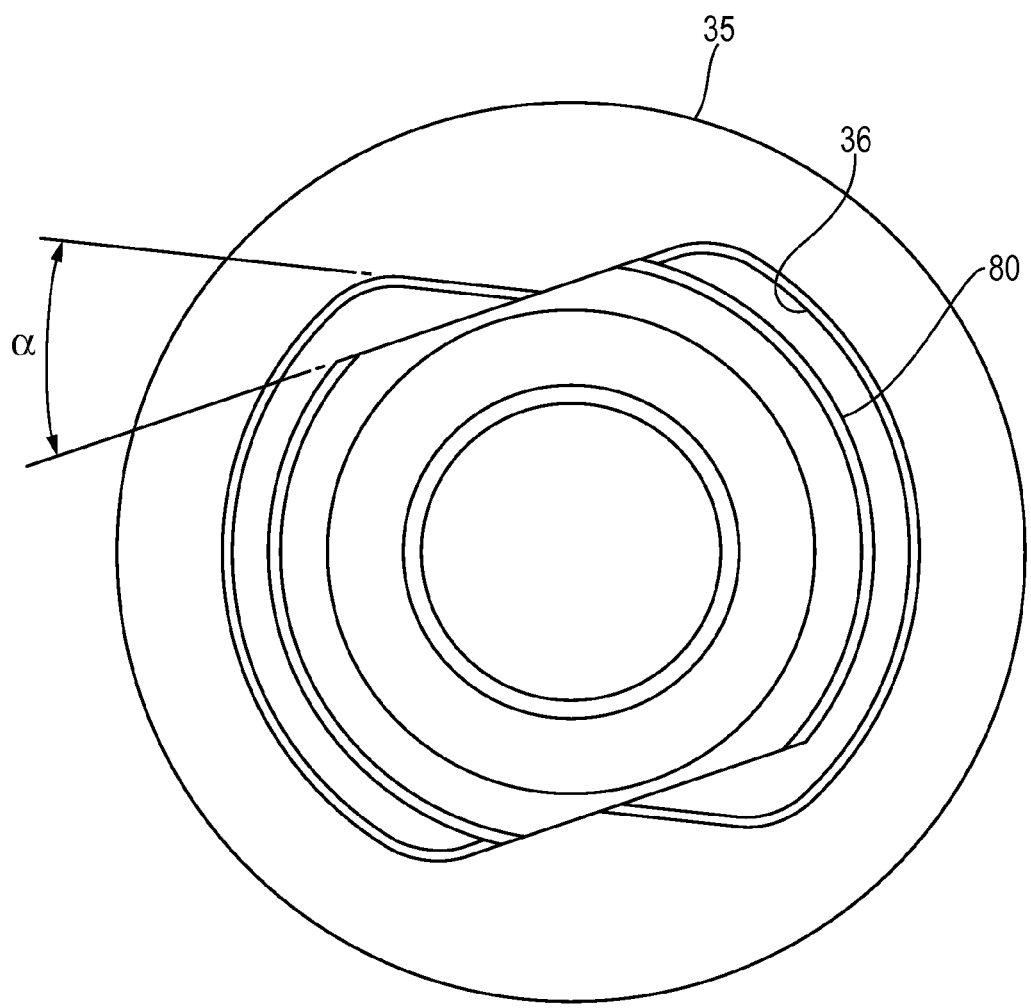
FIG. 5 is a schematic view of an example connection between a clutch feature and a gear shaft.

When transitioning from the MANUAL OVERRIDE MODE or the CHUCK MODE into the DRILL/DRIVE MODE, the shift ring 12 may move in an axial rearward direction so that the radial inward facing splines of the shift ring 12 (already engaged with the radial outward facing splines of the output coupling 20) may encounter and engage with the radial outward facing splines of the gear shaft coupling 30. By virtue of the connection between the clutch feature 35 and the gear shaft 80 (as shown in FIG. 5), the gear shaft 80 may be angularly displaceable through an angle $\alpha$ relative to the clutch feature 35 and the input shaft 60 to facilitate the spline connection between the gear shaft coupling 30 and the shift ring 12.

II. Example Embodiment Depicted in FIGS. 6-9

FIGS. 6-9 show another example, non-limiting embodiment of a PTO mechanism 110 that may support a tool chuck 150. This example embodiment is similar to the one noted in section I above to the extent that the tool chuck may be operated in three different modes inclusive of the DRILL/DRIVE MODE, the MANUAL OVERRIDE MODE and the CHUCK MODE. But there are some notable differences.

Figure 6:
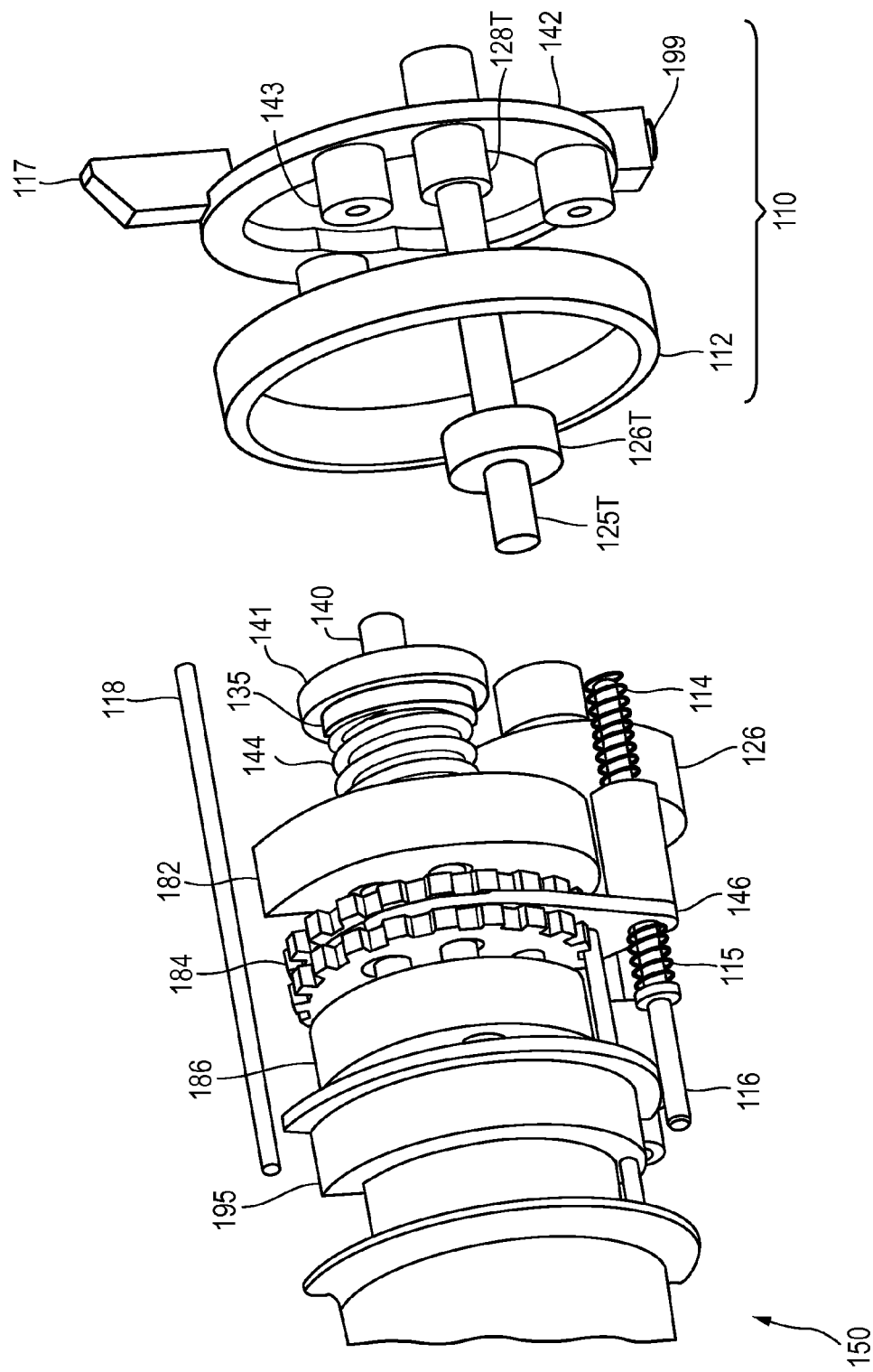
FIGS. 6-9 are schematic views of a tool chuck with a power take off mechanism according to another example, non-limiting embodiment.

A. The Structure:

With reference to FIG. 6, the PTO mechanism 110 may include a carrier 142 that may be mounted for pivot action on a tertiary shaft 125T (of a transmission 170). The carrier 142 may rotatably support idler planet gears 143. The idler planet gears 143 may support and pilot a ring gear 112. The tertiary shaft 125T may include a drive gear 128T that engages with the ring gear 112.

As will be described in more detail below, a push pin 118 (mounted for axial movement in the driver housing 195) may interact with a tab 117 of the carrier 142 to pivot the carrier 142 (and thus the ring gear 112) about the tertiary shaft 125T (counter clockwise in FIG. 6) so that the ring gear 112 may become engaged with a driven gear 141 of a PTO actuator shaft 140. A spring 199 may be captured between the carrier 142 and the driver housing 195 to influence the carrier 142 to a position in which the ring gear 112 may be disengaged from the driven gear 141.

Figure 7:
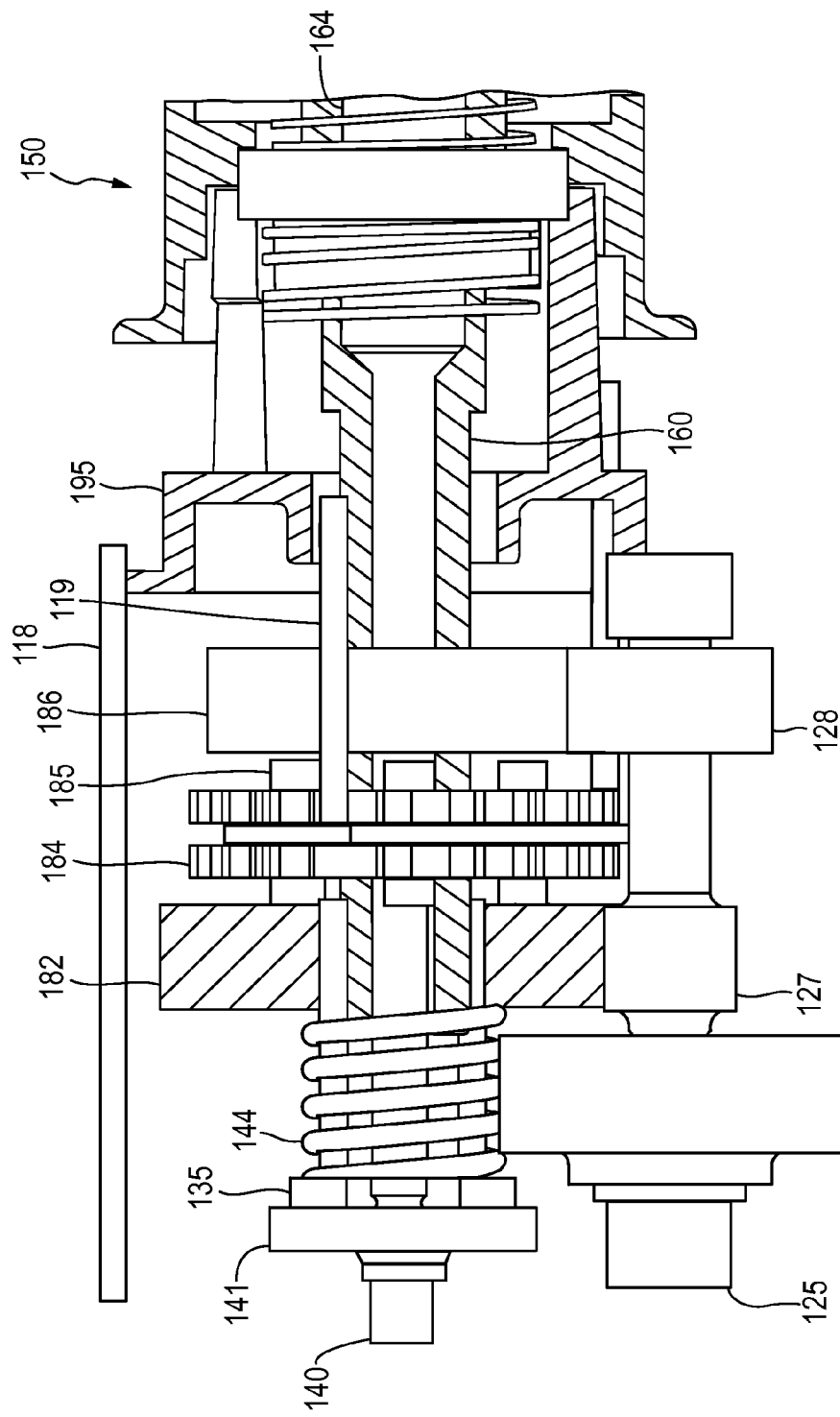

With reference to FIG. 7, the PTO actuator shaft 140 may have a forward end rotationally fixed to a chuck actuating shaft 164. The PTO actuator shaft 140 may fixedly support the driven gear 141. The driven gear 141 may have an axial forward facing surface that abuts against a lock plate 135. The lock plate 135 may be rotationally fixed to an input shaft 160 and axially moveable along the input shaft 160. A spring 144 may be captured between lock plate 135 and a first driven gear 182 to influence the lock plate 135 in an axial rearward direction and against the driven gear 141.

The input shaft 160 may support the first driven gear 182, a shift plate 184 and a second driven gear 186. The first driven gear 182 may be mounted for rotation on the lock plate 135 (which is rotationally fixed to the input shaft 160) and axially moveable along the lock plate 135. The spring 144 may influence the first driven gear 182 toward the axial forward end of the lock plate 135. The second driven gear 186 may be axially fixed to (and rotatable relative to) the input shaft 160.

The shift plate 184 may be rotationally fixed to (and axially moveable relative to) the input shaft 160. The shift plate 184 may include drive lugs 185 for selectively engaging with corresponding features (e.g., recesses) respectively provided in the first driven gear 182 and the second driven gear 186 (depending on the axial position of the shift plate 184). As will be described in more detail below, a push pin 119 (mounted for axial movement in the driver housing 195) may selectively engage with radial outward facing recesses of the shift plate 184 to rotationally ground the shift plate 184 (and thus the input shaft 160) to the driver housing 195. A spring (not shown) may be captured between the push pin 119 and the drive housing 195 to influence the push pin 119 in the axial forward direction.

As shown in FIG. 6, the shift plate 184 may include a circumferential groove that slidably receives a shift fork 146. As will be described in more detail below, a push pin 116 (mounted for axial movement in the driver housing 195) may influence the shift fork 146 (and thus the shift plate 184) to the desired axial position. A spring 115 may be captured between the push pin 116 and the shift fork 146. A spring 114 may be captured between the shift fork 146 and the driver housing 195.

Figure 8:
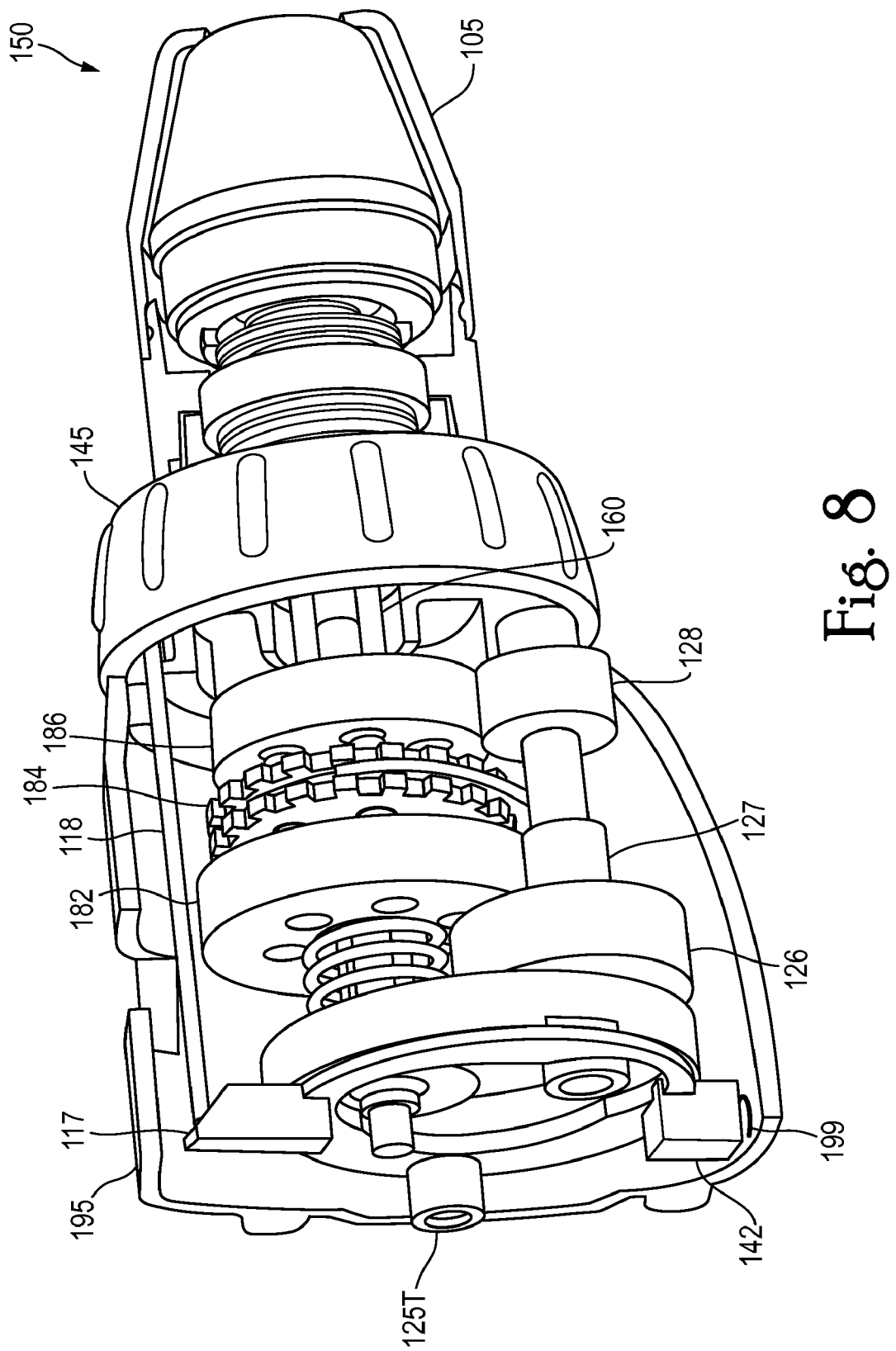

With reference to FIG. 8, a mode ring 145 may be mounted for rotation on the driver housing 195. The mode ring 145 may include circumferential, axial rearward facing cam surfaces (not shown) respectively corresponding to the push pins 118, 119 and 116. A user may rotate the mode ring 145 (relative to the drive housing 195) so that the cam surfaces may axially displace the push pin 118 (to pivot the carrier 142 about the tertiary shaft 125T), the push pin 119 (to selectively ground the shift plate 184 to the driver housing 195) and the push pin 116 (to axially position the shift plate 184 along the input shaft 160).

Turning back to FIG. 7, an electric motor may have a rotary shaft that supports an output gear. The output gear may engage with an input gear 126, which may be fixed to an intermediate shaft 125. The intermediate shaft 125 may be mounted for rotation in the driver housing 195. The intermediate shaft 125 may fixedly support a first drive gear 127 and a second drive gear 128. The first drive gear 127 may engage with the first driven gear 182. And the second drive gear 128 may engage with the second driven gear 186. The second drive gear 128 may be larger than the first drive gear 127. Therefore, when the driver is powered up, the second driven gear 186 may be driven at a faster rotational speed than the first driven gear 182.

Figure 9:
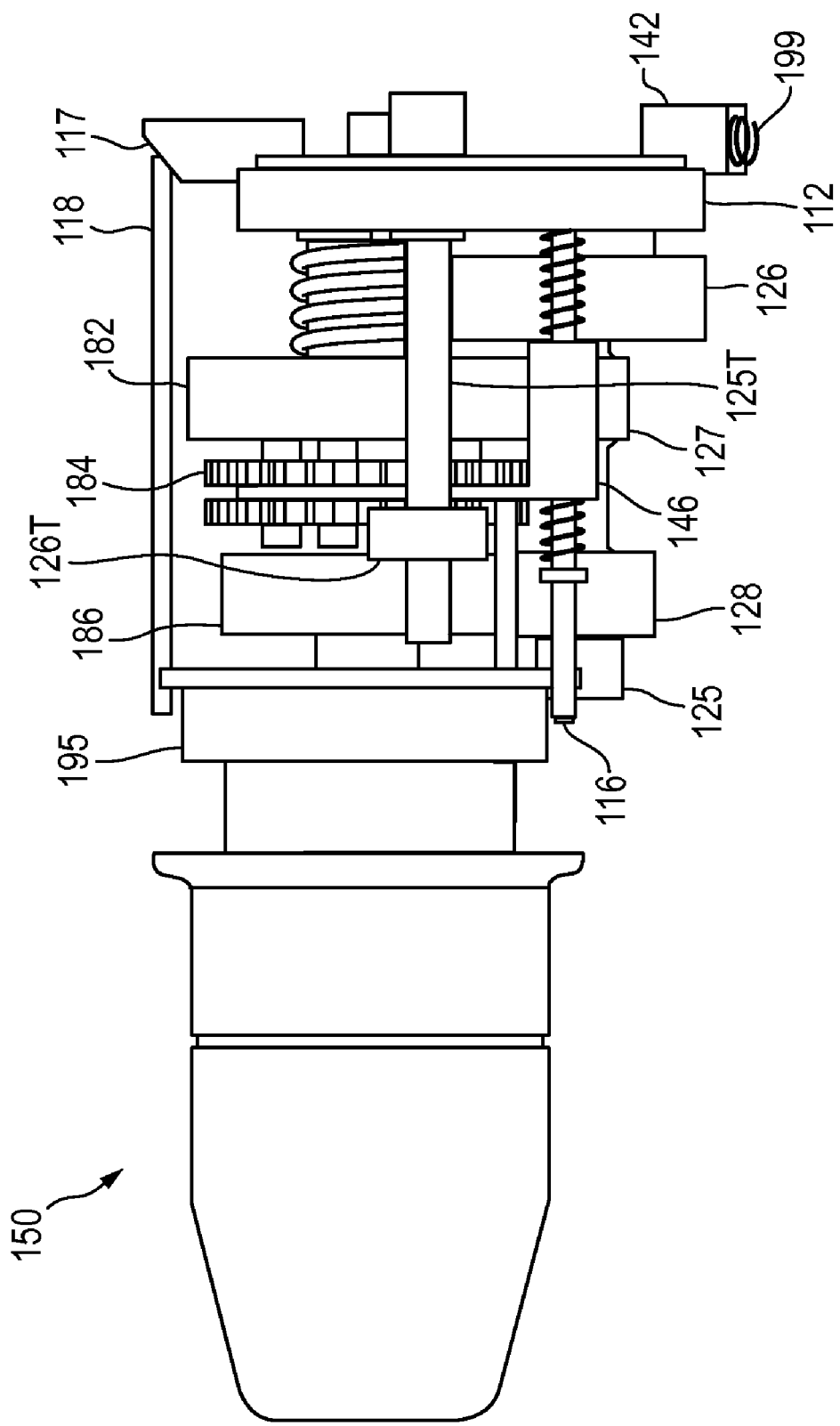

With reference to FIG. 9, the transmission 170 may include a tertiary shaft 125T, which may be mounted for rotation in the driver housing 195. The tertiary shaft 125T may fixedly support an input gear 126T that may be engaged with the second driven gear 186.

As in the previous embodiment, the tool chuck 150 may include the input shaft 160. The axial forward end of the input shaft 160 may be fixed to a jaw holder (not shown). The jaw holder may includes passageways through which chuck jaws (not shown) are respectively slidable. The chuck jaws may be moved axially via slots in a chuck actuating screw (not shown).

The input shaft 160 may include a through bore that rotatably supports the chuck actuating shaft 164. The chuck actuating shaft 164 may include a through bore that may receive the PTO actuator shaft 140, such that the chuck actuating shaft 164 and the PTO actuator shaft 140 may be rotationally locked together. The forward end of the chuck actuating shaft 164 may be screw coupled to the chuck actuating screw.

B. The Operation:

A user may rotate the mode ring 145 (relative to the driver housing 195) so that the tool chuck 150 may be operated in the DRILL/DRIVE MODE (and at varied speeds), the MANUAL OVERRIDE MODE or the CHUCK MODE.

In the DRILL/DRIVE MODE, the carrier 142 may be positioned so that the ring gear 112 may be disengaged from the driven gear 141 of the PTO actuator shaft 140.

When the user powers up the driver, the electric motor (via the output gear) may rotationally drive the intermediate shaft 125 (via the input gear 126). The first drive gear 127 and the second drive gear 128 (fixed to the intermediate shaft 125) may rotationally drive the first driven gear 182 and the second driven gear 186, respectively. The shift plate 184 (via the drive lugs 185) may be rotationally locked to the first driven gear 182 or the second driven gear 186 depending on the axial position of the shift plate 184 relative to the input shaft 160.

For example, assume that the shift plate 184 is positioned axially forward and rotationally locked to the second driven gear 186. Here, power from the transmission 170 may be delivered to the input shaft 160 via the second drive gear 128, the second driven gear 186 and the shift plate 184. The first driven gear 182 may rotate relative to the lock plate 135 (and thus the input shaft 160).

The input shaft 160 may rotate together as a unit with the jaw holder, the chuck jaws and the chuck actuating screw. At the same time, the input shaft 160 may rotationally drive the PTO actuator shaft 140 (and thus the chuck actuating shaft 164) via the lock plate 135 abutting against the driven gear 141. To this end, the confronting surfaces of the lock plate 135 and the driven gear 141 may be friction surfaces and/or include a complement of radial serrations, for example. This may effectively resist relative motion between the input shaft 160 and the chuck actuating shaft 164 so that the chuck jaws may not open or close during operation.

It will be appreciated that the mode ring 145 may be rotated to achieve gear shifting, while maintaining the tool chuck 150 in the DRILL/DRIVE MODE. For example, as the mode ring 145 is rotated, a circumferential cam surface may drive the push pin 116 (and thus the shift fork 146 and the shift plate 184) in an axial rearward direction (and against the influence of the spring 114), while other circumferential cam surfaces may not axially drive the push pins 118, 119. During the axial rearward travel of the shift plate 184, the drive lugs 185 may disengage from the second driven gear 186 and, assuming the shift plate 184 is properly clocked to (or angularly positioned relative to) the first driven gear 182, the drive lugs 185 may engage with the first driven gear 182.

If on the other hand, the shift plate 184 and the first driven gear 182 are not properly clocked, then the shift plate 184 may not be located at the intended axial rearward position. Notwithstanding, the push pin 116 may move to the intended axial rearward position and compress the spring 115. When the driver is powered up, the first driven gear 182 may rotate and become clocked to the shift plate 184. At this time, the spring 115 may drive the shift plate 184 in the axial rearward direction so that the lugs 185 may engage with the first driven gear 182. A similar "compliant" engagement feature may be offered by the spring 114 when the shift plate 184 is moved in the axial forward direction.

FIGS. 8 and 9 illustrate the CHUCK MODE, which may be achieved by rotating the mode ring 145 relative to the driver housing 145. The rotational movements of the mode ring 145 may achieve the following three conditions. First, a circumferential cam surface (of the mode ring 145) may drive the push pin 116 (and thus the shift fork 146 and the shift plate 184) to an axial intermediate position. Here, the shift plate 184 may be disengaged from both the first driven gear 182 and the second driven gear 186.

Second, a circumferential cam surface (of the mode ring 145) may drive the push pin 119 in an axial rearward direction 119 and into the radial outward facing recesses of the shift plate 184 (as shown in FIG. 7) to rotationally ground the shift plate 184 (and thus the input shaft 160) to the driver housing 195.

Third, a circumferential cam surface (of the mode ring 145) may drive the push pin 118 in an axial rearward direction and against the tab 117 of the carrier 142 to pivot the carrier 142 (and thus the ring gear 112) about the tertiary shaft 125T (counter clockwise in FIG. 6). Here, the ring gear 112 may engage with the driven gear 141 of the PTO actuator shaft 140.

The user may power up the driver to actuate the tool chuck 150. Power from the transmission 170 may be delivered to the PTO actuator shaft 140 via the second drive gear 128, the second driven gear 186, the input gear 126T and the drive gear 128T of the tertiary shaft 125T, the ring gear 112 and the driven gear 141. The PTO actuator shaft 140 may rotate together with the chuck actuating shaft 164. The chuck actuating shaft 164 may rotate relative to the chuck actuating screw, which may remain rotationally grounded to the driver housing 195 (via the chuck jaws, the jaw holder, the input shaft 160, the shift plate 184 and the push pin 119). This relative rotation may cause the chuck actuating screw to advance or retract in the axial direction (depending on the rotation direction of the chuck actuating shaft 164) to open or close the chuck jaws.

Once the tool chuck 150 is tight (i.e., when the chuck jaws clamp the accessory) or fully opened, a clutch (not shown) may give way to limit torque transmitted to the chuck system. Numerous and varied conventional clutch features (e.g., a ball detent and/or ramp clutch) may be suitably implemented on the tertiary shaft 125T.

The MANUAL OVERRIDE MODE may be achieved by rotating the mode ring 145 relative to the driver housing 145. During such rotation, the circumferential cam surface (of the mode ring 145) may allow the push pin 119 (under the influence of the spring) to move in an axial forward direction and disengage from the radial outward facing recesses of the shift plate 184. At the same time, the other circumferential cam surfaces (of the mode ring 145) may not axially drive the push pins 116 (and thus the shift plate 184), 118 (and thus the carrier 142). In this condition, the shift plate 184 (and thus the input shaft 160) may be rotatable relative to the driver housing 195, while the ring gear 112 may be engaged with the driven gear 141.

The user may remove the cover 105 and manually rotate the jaw holder (and thus the input shaft 160). At this time, transmission and motor drag may prevent the ring gear 112 (and thus the PTO actuator shaft 140 and the chuck actuating shaft 164) from rotating relative to the driver housing 195 so that the chuck actuating screw may rotate relative to the chuck actuating shaft 164. This relative rotation may cause the chuck actuating screw to advance or retract in the axial direction (depending on the rotation direction of the input shaft 160) to open or close the chuck jaws.

In the MANUAL OVERRIDE MODE, the clutch (not shown) on the tertiary shaft 125T may give way or slip to prevent the system from being over torqued manually and/or in the event that the driver is inadvertently powered up.

III. Example Embodiment Depicted in FIGS. 10-13

FIGS. 10-13 show another example, non-limiting embodiment of a PTO mechanism 210 that may support a tool chuck 250. This example embodiment is similar to the one noted in section II above to the extent that the tool chuck may be operated in three different modes inclusive of the DRILL/DRIVE MODE, the MANUAL OVERRIDE MODE and the CHUCK MODE. But there are some notable differences.

Figure 10:
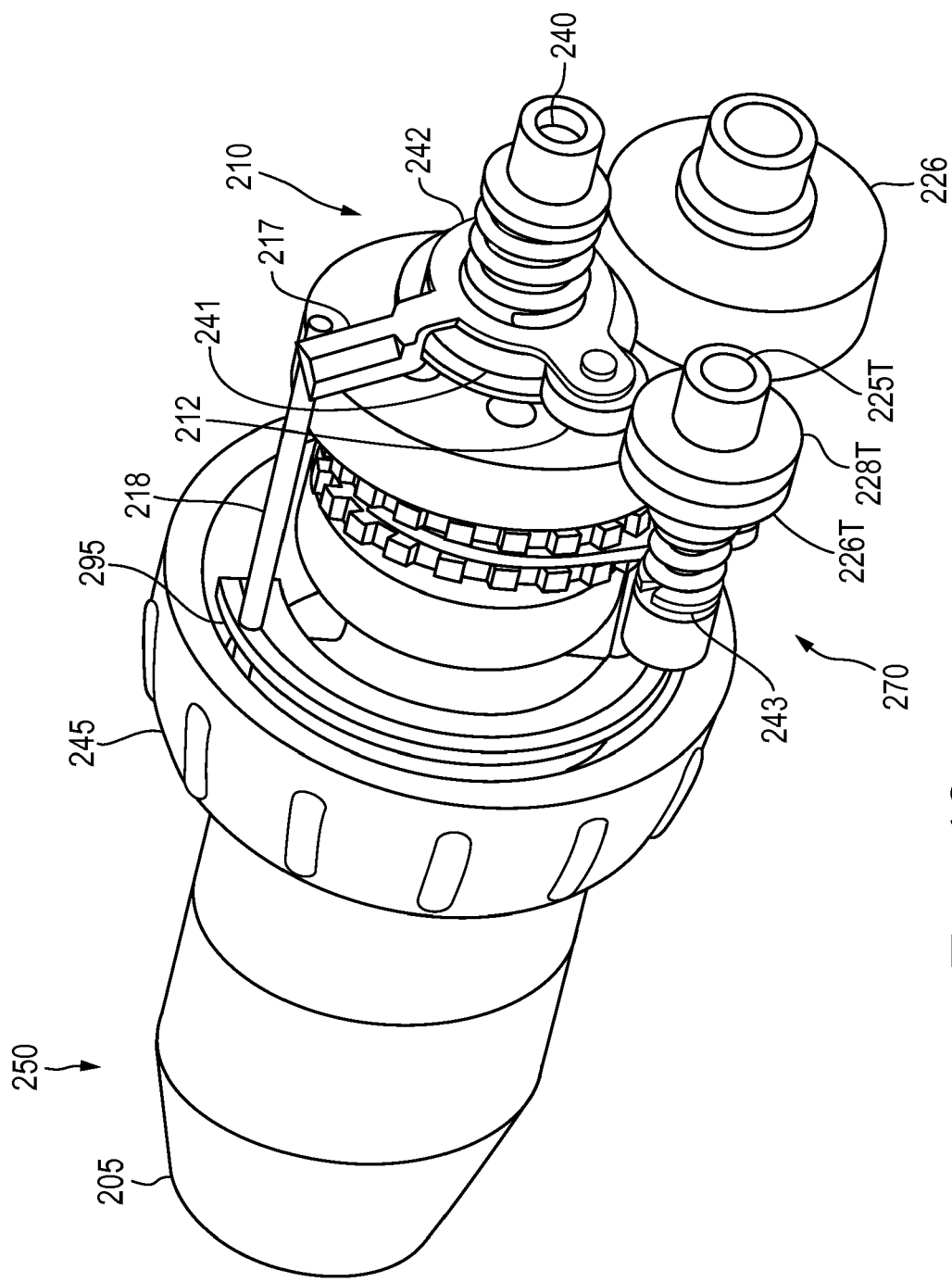
FIGS. 10-13 are schematic views of a tool chuck with a power take off mechanism according to another example, non-limiting embodiment.

A. The Structure:

With reference to FIG. 10, the PTO mechanism 210 may include a carrier 242 that may be mounted for pivot action on a PTO actuator shaft 240. The carrier 242 may rotatably support an idler gear 212. The idler gear 212 may be engaged with a driven gear 241 of the PTO actuator shaft 240. The idler gear 212 may selectively engage with a drive gear 228T of a tertiary shaft 225T.

As will be described in more detail below, a push pin 218 (mounted for axial movement in the driver housing 295) may interact with a tab 217 of the carrier 242 to pivot the carrier 242 (and thus the idler gear 212) about the PTO actuator shaft 240 (counter clockwise in FIG. 10) so that the idler gear 212 may become engaged with the drive gear 228T of the tertiary shaft 225T. A spring (not shown) may influence the carrier 242 to a position in which the idler gear 212 may be disengaged from the drive gear 228T.

Figure 11:
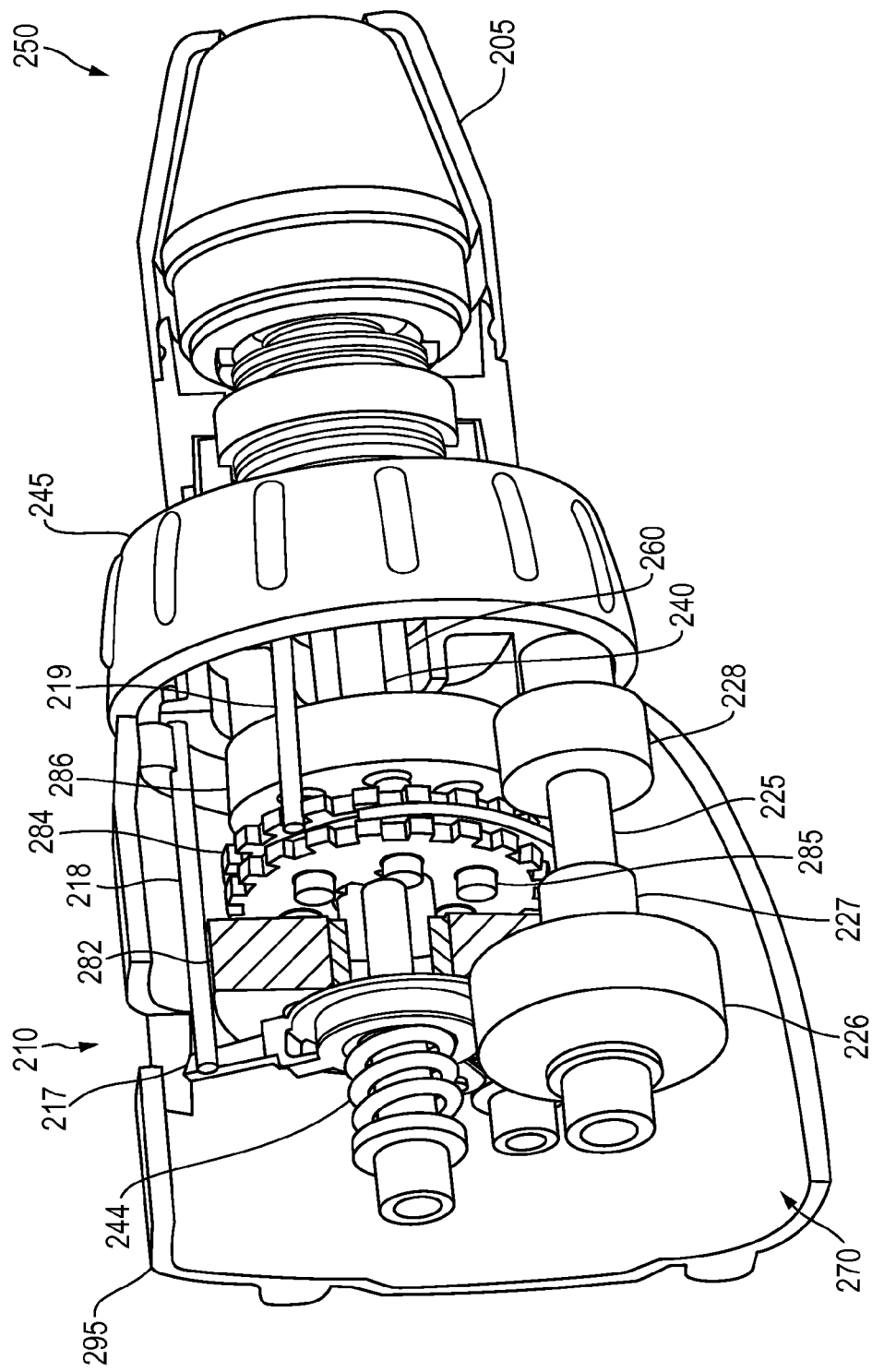
Figure 12:
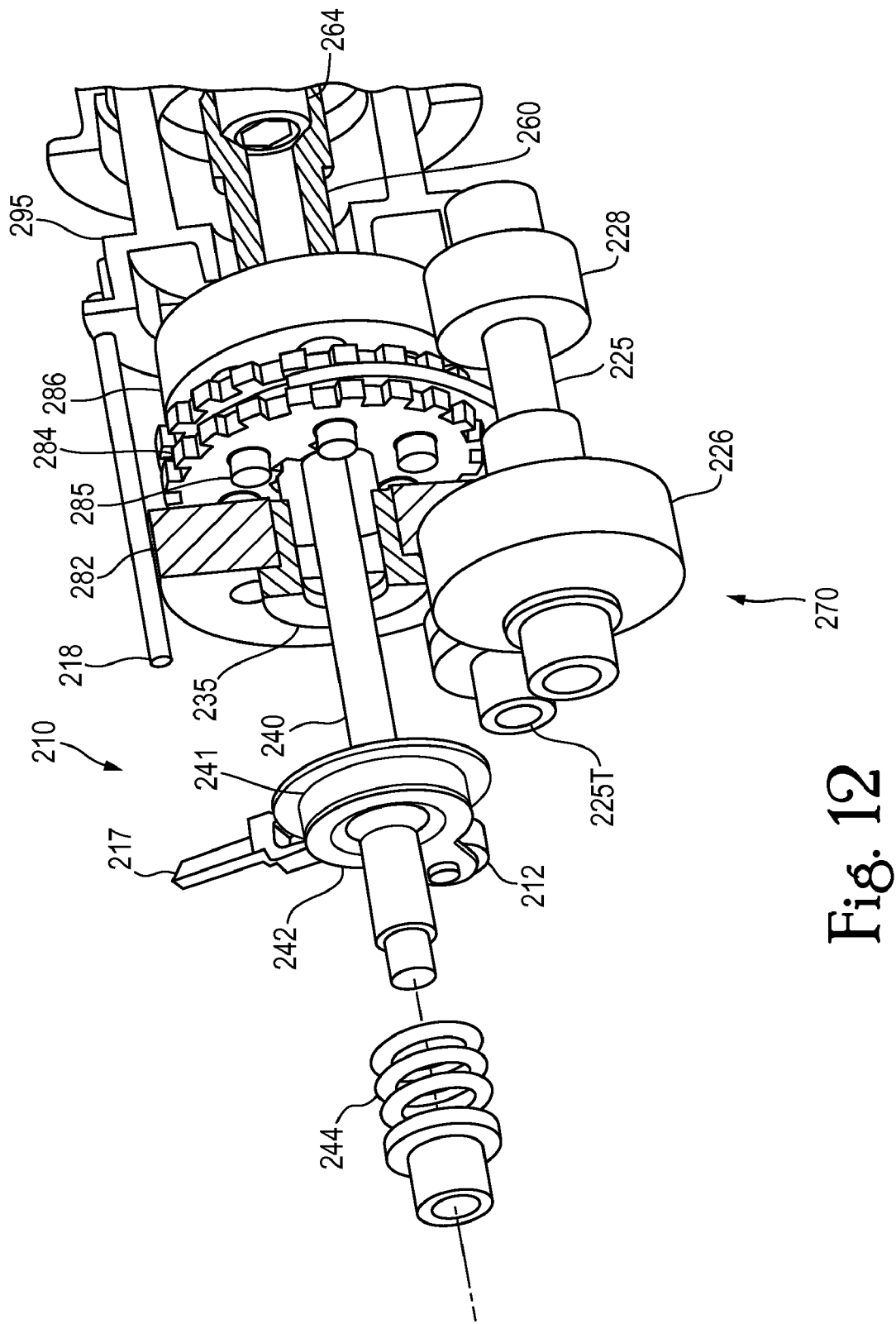

With reference to FIGS. 11 and 12, the PTO actuator shaft 240 may have a forward end rotationally fixed to a chuck actuating shaft 264. The PTO actuator shaft 240 may fixedly support the driven gear 241. The driven gear 241 may have an axial forward facing surface that abuts against a lock plate 235. The lock plate 235 may be rotationally fixed to an input shaft 260 and axially moveable along the input shaft 260. A spring 244 may be captured between the driver housing 295 and the driven gear 241 to influence the driven gear 241 in an axial forward direction and against the lock plate 235.

The input shaft 260 may support a first driven gear 282, a shift plate 284 and a second driven gear 286. The first driven gear 282 may be mounted for rotation on the lock plate 235 (which is rotationally fixed to the input shaft 260) and axially fixed to the lock plate 235. The second driven gear 286 may be axially fixed to (and rotatable relative to) the input shaft 260.

The shift plate 284 may be rotationally fixed to (and axially moveable relative to) the input shaft 260. The shift plate 284 may include drive lugs 285 for selectively engaging with corresponding features (e.g., recesses) respectively provided in the first driven gear 282 and the second driven gear 286 (depending on the axial position of the shift plate 284). As will be described in more detail below, a push pin 219 (mounted for axial movement in the driver housing 295) may selectively engage with radial outward facing recesses of the shift plate 284 to rotationally ground the shift plate 284 (and thus the input shaft 260) to the driver housing 295. A spring (not shown) may be captured between the push pin 219 and the drive housing 295 to influence the push pin 219 in the axial forward direction.

Figure 13:
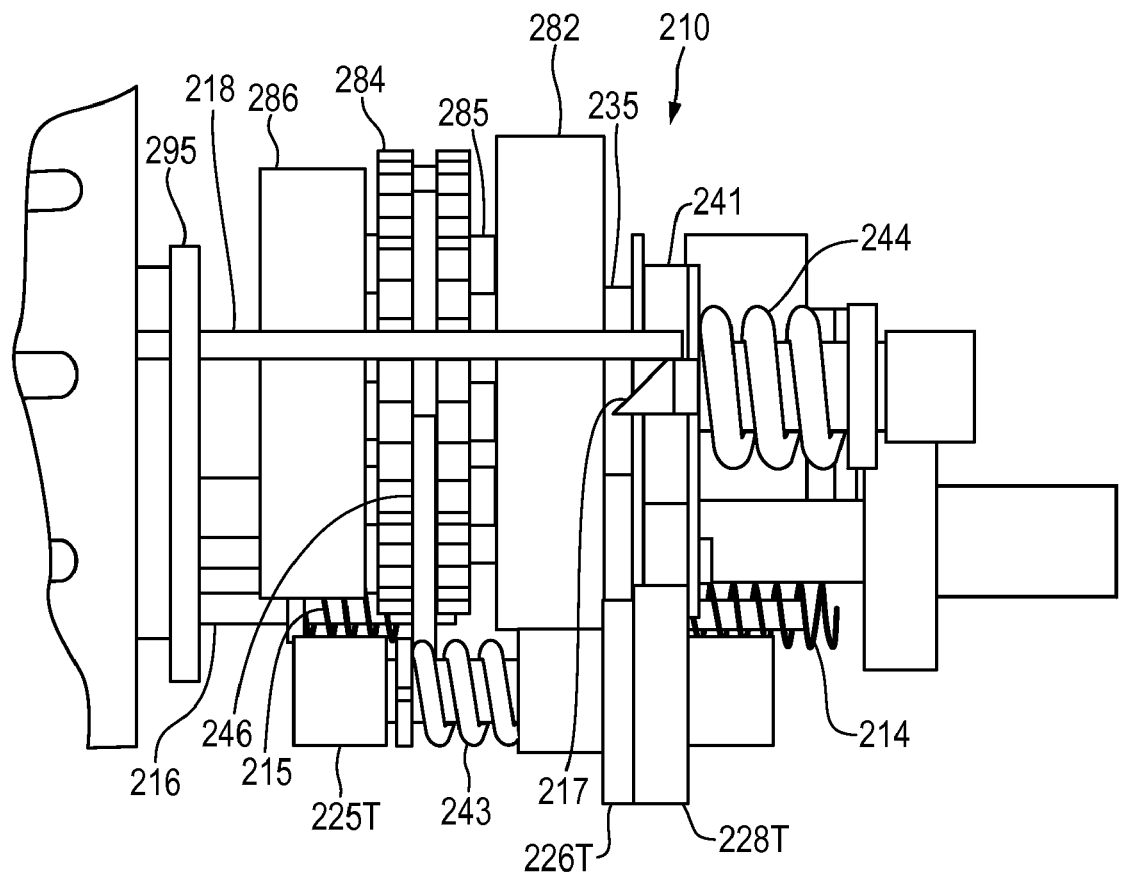

As shown in FIG. 13, the shift plate 284 may include a circumferential groove that slidably receives a shift fork 246. As will be described in more detail below, a push pin 216 (mounted for axial movement in the driver housing 295) may influence the shift fork 246 (and thus the shift plate 284) to the desired axial position. A spring 215 may be captured between the push pin 216 and the shift fork 246. A spring 214 may be captured between the shift fork 246 and the driver housing 295.

Turning back to FIGS. 10 and 11, a mode ring 245 may be mounted for rotation on the driver housing 295. The mode ring 245 may include circumferential, axial rearward facing cam surfaces (not shown) respectively corresponding to the push pins 218, 219 and 216. A user may rotate the mode ring 245 (relative to the drive housing 295) so that the cam surfaces may axially displace the push pin 218 (to pivot the carrier 242 about the PTO actuator shaft 240), the push pin 219 (to selectively ground the shift plate 284 to the driver housing 295) and the push pin 216 (to axially position the shift plate 284 along the input shaft 260).

An electric motor may have a rotary shaft that supports an output gear. The output gear may engage with an input gear 226, which may be fixed to an intermediate shaft 225. The intermediate shaft 225 may be mounted for rotation in the driver housing 295. The intermediate shaft 225 may fixedly support a first drive gear 227 and a second drive gear 228. The first drive gear 227 may engage with the first driven gear 282. And the second drive gear 228 may engage with the second driven gear 286.

With reference to FIG. 13, the transmission 270 may include a tertiary shaft 225T, which may be mounted for rotation in the driver housing 295. The tertiary shaft 225T may fixedly support the drive gear 228T. The tertiary shaft 225T may support an input gear 226T. The input gear 226T may be rotatable (and axially moveable) relative to the tertiary shaft 225T. A spring 243 may influence the input gear 226T in an axial rearward direction and against the drive gear 228T. The confronting surfaces of the input gear 226T and the drive gear 228T may have cooperating clutch features. The input gear 226T may be engaged with the first driven gear 282.

As in the previous embodiments, the tool chuck 250 may include the input shaft 260 (see FIG. 12). The axial forward end of the input shaft 260 may be fixed to a jaw holder (not shown). The jaw holder may include passageways through which chuck jaws (not shown) are respectively slidable. The chuck jaws may be moved axially via slots in a chuck actuating screw (not shown).

The input shaft 260 may include a through bore that rotatably supports the chuck actuating shaft 264 (see FIG. 12). The chuck actuating shaft 264 may include a through bore that may receive the PTO actuator shaft 240, such that the chuck actuating shaft 264 and the PTO actuator shaft 240 may be rotationally locked together. The forward end of the chuck actuating shaft 264 may be screw coupled to the chuck actuating screw.

B. The Operation:

A user may rotate the mode ring 245 (relative to the driver housing 295) so that the tool chuck 250 may be operated in the DRILL/DRIVE MODE (and at varied speeds), the MANUAL OVERRIDE MODE or the CHUCK MODE.

In the DRILL/DRIVE MODE, the carrier 242 may be positioned so that the idler gear 212 may be disengaged from the drive gear 228T of the tertiary shaft 225T.

When the user powers up the driver, the electric motor (via the output gear) may rotationally drive the intermediate shaft 225 (via the input gear 226). The first drive gear 227 and the second drive gear 228 may rotationally drive the first driven gear 282 and the second driven gear 286, respectively. The shift plate 284 (via the drive lugs 285) may be rotationally locked to the first driven gear 282 or the second driven gear 286 depending on the axial position of the shift plate 284 relative to the input shaft 260.

For example, assume that the shift plate 284 is positioned axially forward and rotationally locked to the second driven gear 286. Here, power from the transmission 270 may be delivered to the input shaft 260 via the second drive gear 228, the second driven gear 286 and the shift plate 284. The first driven gear 282 may rotate relative to the lock plate 235 (and thus the input shaft 260).

The input shaft 260 may rotate together as a unit with the jaw holder, the chuck jaws and the chuck actuating screw. At the same time, the input shaft 260 may rotationally drive the PTO actuator shaft 240 (and thus the chuck actuating shaft 264) via the lock plate 235 abutting against the driven gear 241.

As in the previous embodiment, the mode ring 245 may be rotated to achieve gear shifting, while maintaining the tool chuck 250 in the DRILL/DRIVE MODE. Also, the springs 214, 215 may offer "compliant" engagement features when the shift plate 284 transitions between axial positions.

FIGS. 10 and 11 illustrate the CHUCK MODE, which may be achieved by rotating the mode ring 245 relative to the driver housing 245. The rotational movements of the mode ring 245 may achieve the following three conditions. First, a circumferential cam surface (of the mode ring 245) may drive the push pin 216 (and thus the shift fork 246 and the shift plate 284) to an axial intermediate position. Second, a circumferential cam surface (of the mode ring 245) may drive the push pin 219 in an axial rearward direction into the radial outward facing recesses of the shift plate 284. Third, a circumferential cam surface (of the mode ring 245) may drive the push pin 218 in an axial rearward direction and against the tab 217 of the carrier 242 to pivot the carrier 242 (and thus the idler gear 212) about the PTO actuator shaft 240 (counter clockwise in FIG. 10). Here, the idler gear 212 may engage with the drive gear 228T of the tertiary shaft 225T.

The user may power up the driver to actuate the tool chuck 250. Power from the transmission 270 may be delivered to the PTO actuator shaft 240 via the first drive gear 227, the first driven gear 282, the input gear 226T and the drive gear 228T of the tertiary shaft 225T, the idler gear 212 and the driven gear 241. The PTO actuator shaft 240 may rotate together with the chuck actuating shaft 264. The chuck actuating shaft 264 may rotate relative to the chuck actuating screw, which may remain rotationally grounded to the driver housing 295 (via the chuck jaws, the jaw holder, the input shaft 260, the shift plate 284 and the push pin 219). This relative rotation may cause the chuck actuating screw to advance or retract in the axial direction (depending on the rotation direction of the chuck actuating shaft 264) to open or close the chuck jaws.

Once the tool chuck 250 is tight (i.e., when the chuck jaws clamp the accessory) or fully opened, the cooperating clutch features respectively provided on the input gear 226T and the drive gear 228T may give way and slip relative to each other. At this time, the input gear 226T may move in an axial forward direction (against the influence of the spring 243). When the cooperating clutch features slip, they may produce an audible indication that the chuck actuation process is complete.

The MANUAL OVERRIDE MODE may be achieved by rotating the mode ring 245 relative to the driver housing 245. During such rotation, the circumferential cam surface (of the mode ring 245) may allow the push pin 219 (under the influence of the spring) to move in an axial forward direction and disengage from the radial outward facing recesses of the shift plate 284. At the same time, the other circumferential cam surfaces (of the mode ring 245) may not axially drive the push pins 216 (and thus the shift plate 284), 218 (and thus the carrier 242). In this condition, the shift plate 284 (and thus the input shaft 260) may be rotatable relative to the driver housing 295, while the idler gear 212 may be engaged with the drive gear 228T.

The user may remove the cover 205 and manually rotate the jaw holder (and thus the input shaft 260). At this time, transmission and motor drag may prevent the idler gear 212 (and thus the PTO actuator shaft 240 and the chuck actuating shaft 264) from rotating relative to the driver housing 295 so that the chuck actuating screw may rotate relative to the chuck actuating shaft 264. This relative rotation may cause the chuck actuating screw to advance or retract in the axial direction (depending on the rotation direction of the input shaft 260) to open or close the chuck jaws.

In the MANUAL OVERRIDE MODE, the cooperating clutch features respectively provided on the input gear 226T and the drive gear 228T may give way and slip to prevent the system from being over torqued manually and/or in the event that the driver is inadvertently powered up.

IV. Example Embodiment Depicted in FIGS. 14-16

Figure 14:
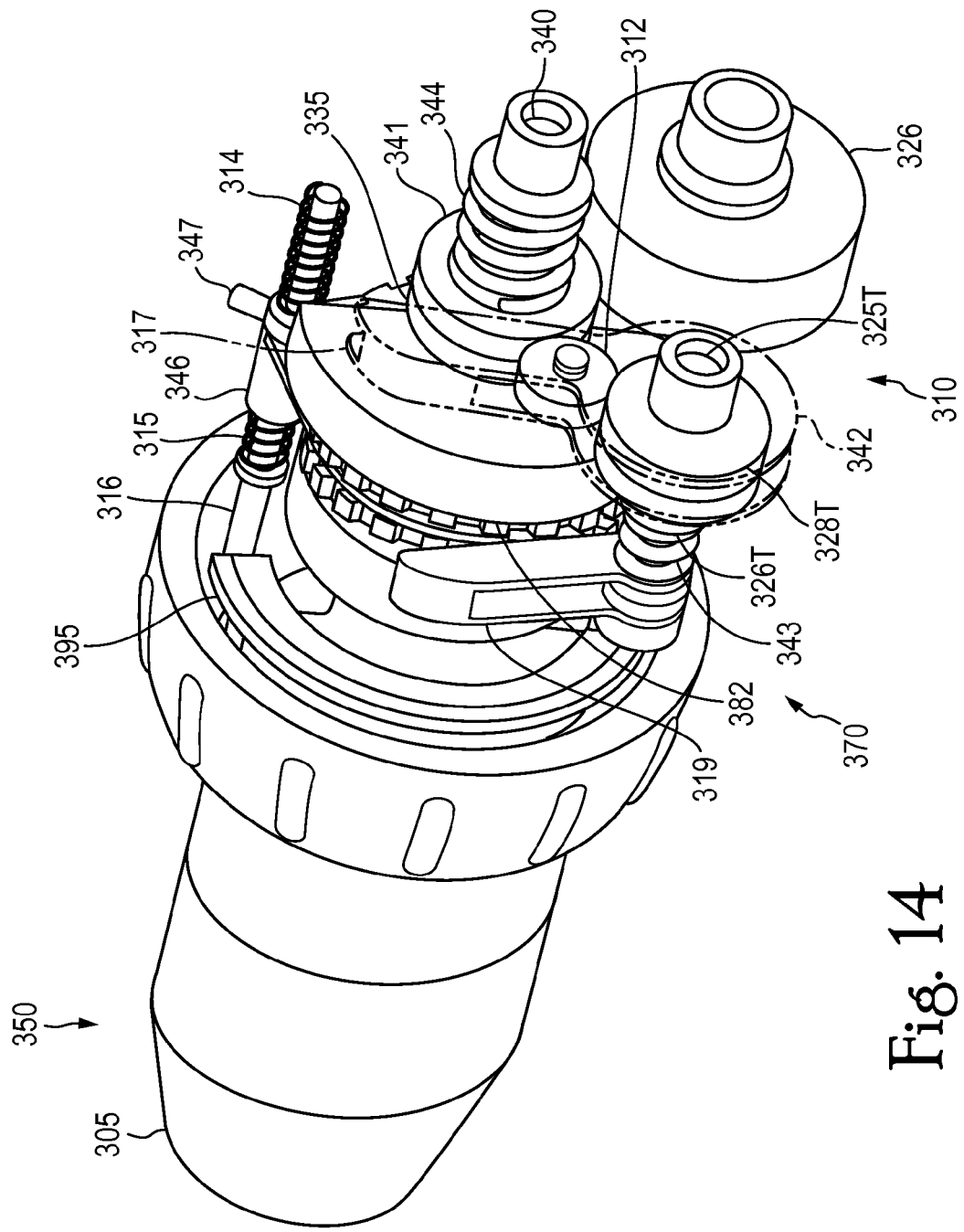
FIGS. 14-16 are schematic views of a tool chuck with a power take off mechanism according to another example, non-limiting embodiment.
Figure 15:
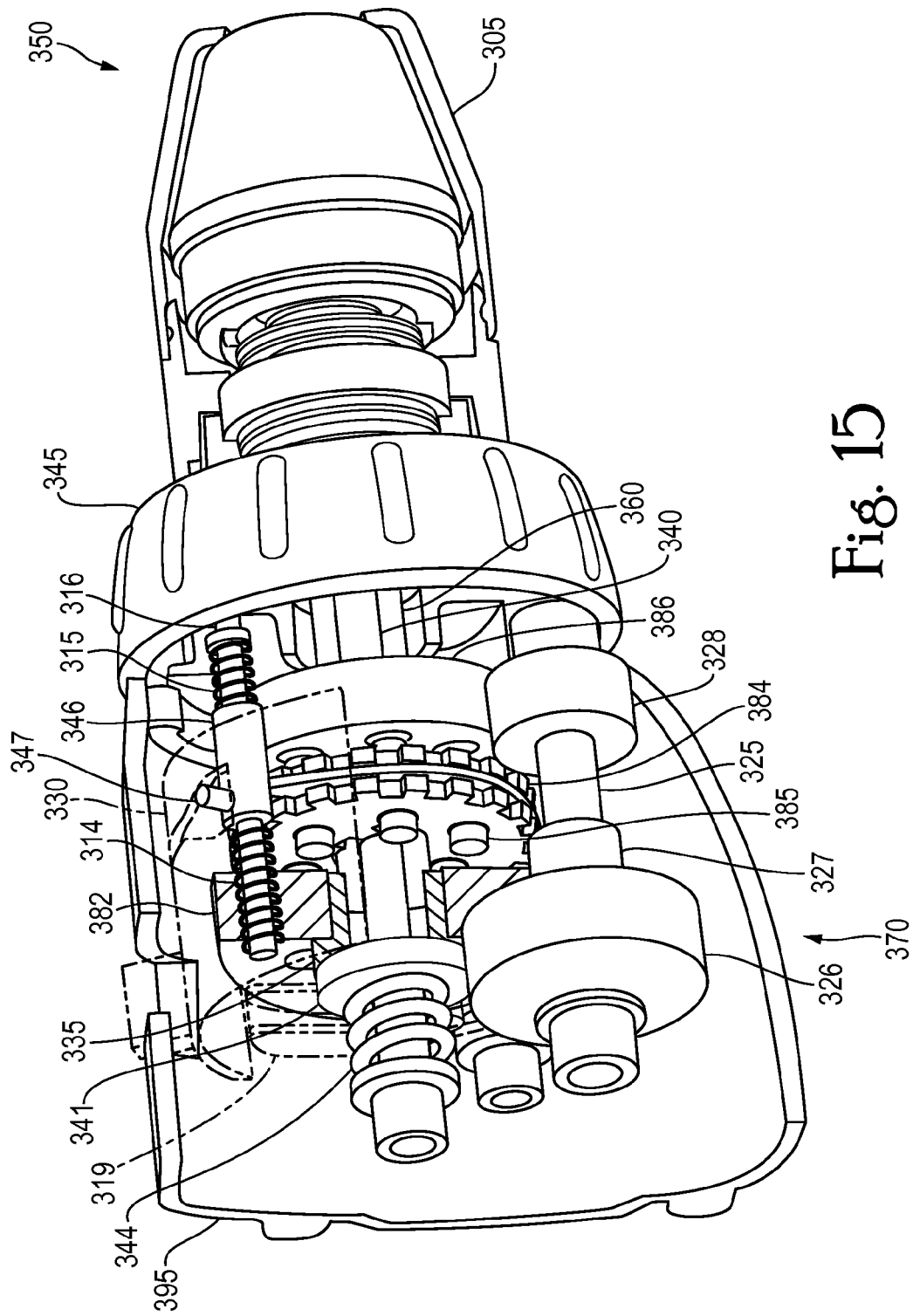
Figure 16:
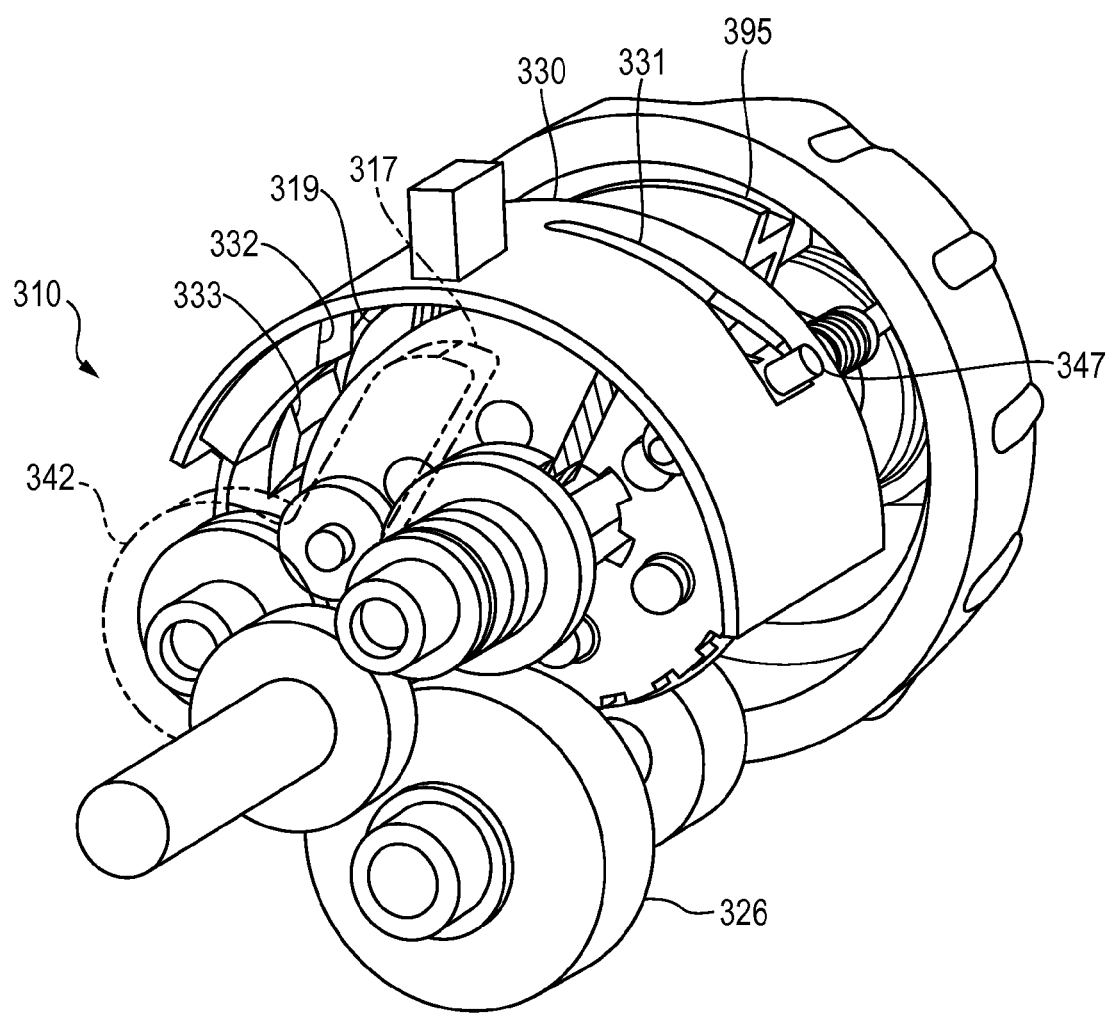

FIGS. 14-16 show another example, non-limiting embodiment of a PTO mechanism 310 that may support a tool chuck 350. This example embodiment is similar to the one noted in section III above to the extent that the tool chuck may be operated in three different modes inclusive of the DRILL/ DRIVE MODE, the MANUAL OVERRIDE MODE and the CHUCK MODE. But there are some notable differences.

A. The Structure:

With reference to FIG. 14, the PTO mechanism 310 may include a carrier 342 that may be mounted for pivot action on a tertiary shaft 325T. The carrier 342 may rotatably support an idler gear 312. The idler gear 312 may be engaged with a drive gear 328T of the tertiary shaft 325T. The idler gear 312 may selectively engage with a driven gear 341 of a PTO actuator shaft 340.

As will be described in more detail below, a shift collar 330 (mounted for rotational movement on the driver housing 395) may interact with a tab 317 of the carrier 342 to pivot the carrier 342 (and thus the idler gear 312) about the tertiary shaft 325T (clockwise in FIG. 14) so that the idler gear 312 may become engaged with the driven gear 341 of the PTO actuator shaft 340. A spring (not shown) may influence the carrier 342 to a position in which the idler gear 312 may be disengaged from the driven gear 341.

With reference to FIG. 15, the PTO actuator shaft 340 may have a forward end rotationally fixed to a chuck actuating shaft (not shown). The PTO actuator shaft 340 may fixedly support the driven gear 341. The driven gear 341 may have an axial forward facing surface that abuts against a lock plate 335. The lock plate 335 may be rotationally fixed to an input shaft 360 and axially moveable along the input shaft 360. A spring 344 may be captured between the driver housing 395 and the driven gear 341 to influence the driven gear 341 in an axial forward direction and against the lock plate 335.

The input shaft 360 may support a first driven gear 382, a shift plate 384 and a second driven gear 386. The first driven gear 382 may be mounted for rotation on the lock plate 335 and axially fixed to the lock plate 335. The second driven gear 386 may be axially fixed to (and rotatable relative to) the input shaft 360.

The shift plate 384 may be rotationally fixed to (and axially moveable relative to) the input shaft 360. The shift plate 384 may include drive lugs 385 for selectively engaging with corresponding features (e.g., recesses) respectively provided in the first driven gear 382 and the second driven gear 386 (depending on the axial position of the shift plate 384). As will be described in more detail below, a lock arm 319 (mounted for pivot action on the tertiary shaft 325T) may selectively engage with radial outward facing recesses of the shift plate 384 to rotationally ground the shift plate 384 (and thus the input shaft 360) to the driver housing 395. A spring (not shown) may influence the lock arm 319 to pivot (counter clock wise in FIG. 14) so that the lock arm 319 disengages from the shift plate 384.

As shown in FIG. 15, the shift plate 384 may include a circumferential groove that slidably receives a shift fork 346. As will be described in more detail below, the shift fork 346 may include a radial pin 347 that may cooperate with a slot 331 in the shift collar 330 (see FIG. 16) to influence the shift fork 346 (and thus the shift plate 384) to the desired axial position. As will be described in more detail below, a push pin 316 (mounted for axial movement in the driver housing 395) may influence the shift fork 346 (and thus the shift plate 384) to the desired axial position. A spring 315 may be captured between the push pin 316 and the shift fork 346. A spring 314 may be captured between the shift fork 346 and the driver housing 395.

A mode ring 345 may be mounted for rotation on the driver housing 395. The mode ring 345 may include a circumferential, axial rearward facing cam surface (not shown) corresponding to the push pin 316. A user may rotate the mode ring 345 (relative to the drive housing 395) so that the cam surface may axially displace the push pin 316 (to axially position the shift plate 384 along the input shaft 360).

Turning to FIG. 16, the shift collar 330 may be mounted for rotation on the driver housing 395. The shift collar 330 may include the slot 331 to interact with the radial pin 347 of the shift fork 346. The shift collar 330 may also include a tab actuating cam 332 and a lock arm actuating cam 333 respectively corresponding to the tab 317 and the lock arm 319. A user may rotate the shift collar 330 (relative to the drive housing 395) so that the slot 331 may axially displace the shift fork 346 (and thus the shift plate 384), the tab actuating cam 332 may influence the tab 317 in a radial inward direction, and the lock arm actuating cam 333 may influence the lock arm 319 in a radial inward direction.

Turning back to FIG. 15, an electric motor may have a rotary shaft that supports an output gear. The output gear may engage with an input gear 326, which may be fixed to an intermediate shaft 325. The intermediate shaft 325 may be mounted for rotation in the driver housing 395. The intermediate shaft 325 may fixedly support a first drive gear 327 and a second drive gear 328. The first drive gear 327 may engage with the first driven gear 382. And the second drive gear 328 may engage with the second driven gear 386.

With reference to FIG. 14, the transmission 370 may include the tertiary shaft 325T, which may be mounted for rotation in the driver housing 395. The tertiary shaft 325T may fixedly support the drive gear 328T. The tertiary shaft 325T may support an input gear 326T. The input gear 326T may be rotatable (and axially moveable) relative to the tertiary shaft 325T. A spring 343 may influence the input gear 326T in an axial rearward direction and against the drive gear 328T. The confronting surfaces of the input gear 326T and the drive gear 328T may have cooperating clutch features. The input gear 326T may be engaged with the first driven gear 382.

As in the previous embodiments, the tool chuck 350 may include the input shaft 360. The axial forward end of the input shaft 360 may be fixed to a jaw holder (not shown). The jaw holder may include passageways through which chuck jaws (not shown) are respectively slidable. The chuck jaws may be moved axially via slots in a chuck actuating screw (not shown).

The input shaft 360 may include a through bore that rotatably supports the chuck actuating shaft (not shown). The chuck actuating shaft may include a through bore that may receive the PTO actuator shaft 340, such that the chuck actuating shaft and the PTO actuator shaft 340 may be rotationally locked together. The forward end of the chuck actuating shaft may be screw coupled to the chuck actuating screw.

B. The Operation:

A user may rotate the mode ring 345 (relative to the driver housing 395), when the tool chuck 350 is in the DRILL/DRIVE MODE, to effect a speed change. A user may rotate the shift collar 330 so that the tool chuck 350 may be operated in the MANUAL OVERRIDE MODE or the CHUCK MODE.

In the DRILL/DRIVE MODE, the carrier 342 may be positioned so that the idler gear 312 may be disengaged from the driven gear 341 of the PTO actuator shaft 340.

When the user powers up the driver, the electric motor (via the output gear) may rotationally drive the intermediate shaft 325 (via the input gear 326). The first drive gear 327 and the second drive gear 328 may rotationally drive the first driven gear 382 and the second driven gear 386, respectively. The shift plate 384 (via the drive lugs 385) may be rotationally locked to the first driven gear 382 or the second driven gear 386 depending on the axial position of the shift plate 384 relative to the input shaft 360.

The input shaft 360 may rotate together as a unit with the jaw holder, the chuck jaws and the chuck actuating screw. At the same time, the input shaft 360 may rotationally drive the PTO actuator shaft 340 (and thus the chuck actuating shaft 364) via the lock plate 335 abutting against the driven gear 341.

As in the previous embodiment, the mode ring 345 may be rotated to achieve gear shifting, while maintaining the tool chuck 350 in the DRILL/DRIVE MODE. Also, the springs 314, 315 may offer "compliant" engagement features when the shift plate 384 transitions between axial positions.

The CHUCK MODE may be achieved by rotating the shift collar 330 relative to the driver housing 395. The rotational movements of the shift collar 330 may achieve the following three conditions. First, the slot 331 (of the shift collar) may drive the radial pin 347 (and thus the shift fork 346 and the shift plate 384) to an axial intermediate position. Here, the shift plate 384 may be disengaged from the first and the second driven gears 382, 386, respectively. Also, the compliance provided by the springs 314, 315 may allow the action of the shift collar 330 and the slot 331 to override the gear selector.

Second, the lock arm actuating cam 333 (of the shift collar 330) may influence the lock arm 319 to pivot about the tertiary shaft 325T (clockwise in FIG. 14) so that the lock arm 319 may engage with the radial outward facing recesses of the shift plate 384. Here, the shift plate 384 (and thus the input shaft 360) may be rotationally grounded to the housing 395.

Third, the tab actuating cam 332 (of the shift collar 330) may interact with the tab 317 of the carrier 342 to pivot the carrier 342 (and thus the idler gear 312) about the tertiary shaft 325T (clockwise in FIG. 14). Here, the idler gear 312 may engage with the driven gear 341 of the PTO actuator shaft 340.

The user may power up the driver to actuate the tool chuck 350. Power from the transmission 370 may be delivered to the PTO actuator shaft 340 via the first drive gear 327, the first driven gear 382, the input gear 326T and the drive gear 328T of the tertiary shaft 325T, the idler gear 312 and the driven gear 341. The PTO actuator shaft 340 may rotate together with the chuck actuating shaft. The chuck actuating shaft may rotate relative to the chuck actuating screw, which may remain rotationally grounded to the driver housing 395 (via the chuck jaws, the jaw holder, the input shaft 360, the shift plate 384 and the lock arm 319). This relative rotation may cause the chuck actuating screw to advance or retract in the axial direction (depending on the rotation direction of the chuck actuating shaft) to open or close the chuck jaws.

Once the tool chuck 350 is tight (i.e., when the chuck jaws clamp the accessory) or fully opened, the cooperating clutch features respectively provided on the input gear 326T and the drive gear 328T may give way and slip relative to each other. At this time, the input gear 326T may move in an axial forward direction (against the influence of the spring 343). When the cooperating clutch features slip, they may produce an audible indication that the chuck actuation process is complete.

The MANUAL OVERRIDE MODE may be achieved by rotating the shift collar 330 relative to the driver housing 245. During such rotation, the lock arm actuating cam 333 (of the shift collar 330) may slid across (and clear) the lock arm 319 so that the lock arm 319 (under the influence of the spring) may pivot about the tertiary shaft 325T (counter clock wise in FIG. 14) and disengage from the radial outward facing recesses of the shift plate 384. In this condition, the shift plate 384 (and thus the input shaft 360) may be rotatable relative to the driver housing 395, while the idler gear 312 may be engaged with the driven gear 341.

The user may remove the cover 305 and manually rotate the jaw holder (and thus the input shaft 360). At this time, transmission and motor drag may prevent the idler gear 312 (and thus the PTO actuator shaft 340 and the chuck actuating shaft) from rotating relative to the driver housing 395 so that the chuck actuating screw may rotate relative to the chuck actuating shaft. This relative rotation may cause the chuck actuating screw to advance or retract in the axial direction (depending on the rotation direction of the input shaft 360) to open or close the chuck jaws.

In the MANUAL OVERRIDE MODE, the cooperating clutch features respectively provided on the input gear 326T and the drive gear 328T may give way and slip to prevent the system from being over torqued manually and/or in the event that the driver is inadvertently powered up.

What is claimed is:

1. A power driver comprising:
   a housing;
   a transmission shaft mounted for rotation on the housing;
   a tool chuck having
      an input shaft mounted on the housing so that the input shaft is rotatable relative to the housing, the input shaft supporting chuck jaws, and
      a chuck actuating shaft mounted for rotation on the input shaft; and
   a power take off mechanism connected to the tool chuck, the power take off mechanism being adjustable into
      a DRILL DRIVE MODE to rotationally drive the input shaft and the chuck actuating shaft together as a unit, and
      a CHUCK MODE to use the transmission shaft to rotationally drive the chuck actuating shaft relative to the input shaft.

2. The power driver as set forth in claim 1, wherein the transmission shaft is a gear shaft that is rotationally locked to the input shaft when the power take off mechanism is in the DRILL DRIVE MODE.

3. The power driver as set forth in claim 2, wherein the gear shaft is rotationally coupled to the chuck actuating shaft via a clutch.

4. The power driver as set forth in claim 1, wherein the transmission shaft is a tertiary shaft; and
   wherein the power take off mechanism includes a ring gear mounted for pivot action about the tertiary shaft.

5. The power driver as set forth in claim 4, wherein, when the power take off mechanism is in the CHUCK MODE, the tertiary shaft is rotationally coupled to the ring gear via a clutch.

6. The power driver as set forth in claim 4, comprising a mode ring mounted on the housing for rotation to pivot the ring gear about the tertiary shaft.

7. The power driver as set forth in claim 1, wherein the transmission shaft is a tertiary shaft; and
   wherein the power take off mechanism includes an idler gear mounted for pivot action about a power take off actuator shaft rotationally locked to the chuck actuating shaft.

8. The power driver as set forth in claim 7, wherein, when the power take off mechanism is in the CHUCK MODE, the tertiary shaft is rotationally coupled to the idler gear via a clutch.

9. The power driver as set forth in claim 7, comprising a mode ring mounted on the housing for rotation to pivot the idler gear about the power take off actuator shaft.

10. The power driver as set forth in claim 1, wherein the transmission shaft is a tertiary shaft; and
    wherein the power take off mechanism includes an idler gear mounted for pivot action about the tertiary shaft.

11. The power driver as set forth in claim 10, wherein, when the power take off mechanism is in the CHUCK MODE, the tertiary shaft is rotationally coupled to the idler gear via a clutch.

12. The power driver as set forth in claim 10, comprising a shift collar mounted on the housing for rotation to pivot the idler gear about the tertiary shaft.

13. The power driver as set forth in claim 1, wherein the power take off mechanism in the CHUCK MODE rotationally fixes the input shaft to the housing.

14. The power driver as set forth in claim 1, wherein the power take off mechanism is adjustable into a MANUAL OVERRIDE MODE to manually rotate the input shaft relative to the chuck actuating shaft.

15. The power driver as set forth in claim 1, wherein the chuck jaws are threadless chuck jaws.

16. A power driver comprising:
    a transmission shaft;
    a tool chuck having
       an input shaft mounted on a housing so that the input shaft is rotatable relative to the housing, the input shaft supporting chuck jaws, and
       a chuck actuating shaft mounted for rotation on the input shaft; and
    power take off means for adjusting into
       a DRILL DRIVE MODE to rotationally drive the input shaft and the chuck actuating shaft together as a unit, and
       a CHUCK MODE to use the transmission shaft to rotationally drive the chuck actuating shaft relative to the input shaft.

17. The power driver as set forth in claim 16, wherein the housing rotatably supports the tool chuck; and
    wherein the power take off means in the CHUCK MODE rotationally fixes the input shaft to the housing.

18. The power driver as set forth in claim 16, wherein the power take off means is for adjusting into a MANUAL OVERRIDE MODE to manually rotate the input shaft relative to the chuck actuating shaft.

19. The power driver as set forth in claim 16, wherein the chuck jaws are threadless chuck jaws.

20. A power driver comprising:
    a tool chuck having
       an input shaft with a rotation axis, and
       a chuck actuating shaft mounted for rotation on the input shaft;
    a transmission shaft with a rotation axis that is parallel to and spaced apart from the rotation axis of the input shaft; and
    a power take off mechanism connected to the tool chuck and being adjustable into
       a DRILL DRIVE MODE to rotationally drive the input shaft and the chuck actuating shaft together as a unit, and
       a CHUCK MODE to use the transmission shaft to rotationally drive the chuck actuating shaft relative to the input shaft.

* * * * *